US009098584B1

(12) United States Patent
Fredinburg et al.

(10) Patent No.: US 9,098,584 B1
(45) Date of Patent: Aug. 4, 2015

(54) IMAGE SEARCH PRIVACY PROTECTION TECHNIQUES

(75) Inventors: Dan Fredinburg, San Francisco, CA (US); Ross Graber, Mountain View, CA (US); Peter Klein, San Francisco, CA (US); Andrew Swerdlow, San Francisco, CA (US)

(73) Assignee: Google Inc., Mountain View, CA (US)

( * ) Notice: Subject to any disclaimer, the term of this patent is extended or adjusted under 35 U.S.C. 154(b) by 232 days.

(21) Appl. No.: 13/553,500

(22) Filed: Jul. 19, 2012

(51) Int. Cl.
*G06F 17/30* (2006.01)
*G06Q 50/00* (2012.01)

(52) U.S. Cl.
CPC ...... *G06F 17/30864* (2013.01); *G06F 17/3053* (2013.01); *G06F 17/30533* (2013.01); *G06Q 50/01* (2013.01)

(58) Field of Classification Search
CPC ... G06F 3/00; G06F 3/1462; G06F 17/30244; G06F 17/30047; G06F 17/30247; G06F 17/30256; G06F 17/30271; G06F 17/30554; G06Q 50/01; G06T 1/00
USPC ........... 382/115, 118; 705/7.34, 14.57, 14.58, 705/26.9; 707/713, 723–724, 758, 769, 707/722, 728, E17.019, E17.059, 732, 754
See application file for complete search history.

(56) References Cited

U.S. PATENT DOCUMENTS

| | | | |
|---|---|---|---|
| 7,359,894 B1 | 4/2008 | Liebman |
| 7,565,139 B2 | 7/2009 | Neven, Sr. |
| 7,593,740 B2 | 9/2009 | Crowley |
| 7,613,769 B1 | 11/2009 | Hess |
| 7,680,770 B1 | 3/2010 | Buyukkokten |
| 7,716,140 B1 | 5/2010 | Nielsen |
| 8,010,459 B2 | 8/2011 | Buyukkokten |
| 8,015,119 B2 | 9/2011 | Buyukkokten |
| 8,019,875 B1 | 9/2011 | Nielsen |
| 8,209,330 B1 | 6/2012 | Covell |
| 2004/0148347 A1 | 7/2004 | Appelman |

(Continued)

FOREIGN PATENT DOCUMENTS

WO WO/2011/017653 10/2011

OTHER PUBLICATIONS

Vyas et al. "Towards Automatic Privacy Management in Web 2.0 with Semantic Analysis on Annotations" Collabrate Com2009 http://dx.doi.org/10.4108/1CST.COLLABORATECOM2009.8340.*

(Continued)

*Primary Examiner* — Jason Liao
*Assistant Examiner* — Berhanu Mitiku
(74) *Attorney, Agent, or Firm* — Procopio, Cory, Hargreaves & Savitch LLP

(57) ABSTRACT

A unified search entity, which provides at least visual query based web searching and an associated mechanism for expressing privacy preferences, obtains, from a requester, a visual query including at least a first facial image. The unified search entity identifies, via facial recognition on the at least first facial image, an identity of an individual subject of the at least first facial image and/or at least a second facial image of the individual subject associated with the at least first facial image. The unified search entity obtains, from the individual, via the mechanism for expressing privacy preferences, a plurality of privacy preferences including a visual query preference. The identity of the individual subject and/or the at least second facial image are communicated from the unified search entity to the requester only if permitted by the visual query preference.

26 Claims, 20 Drawing Sheets

(56) References Cited

U.S. PATENT DOCUMENTS

| | | | |
|---|---|---|---|
| 2005/0060417 | A1 | 3/2005 | Rose |
| 2006/0047725 | A1 | 3/2006 | Bramson |
| 2006/0107297 | A1* | 5/2006 | Toyama et al. ............... 725/105 |
| 2008/0134294 | A1 | 6/2008 | Mattox, Jr. |
| 2009/0327488 | A1 | 12/2009 | Sampat |
| 2010/0191824 | A1 | 7/2010 | Lindsay |
| 2011/0038512 | A1* | 2/2011 | Petrou et al. ................. 382/118 |
| 2011/0179117 | A1 | 7/2011 | Appelman |
| 2012/0109858 | A1 | 5/2012 | Makadia |
| 2012/0195506 | A1* | 8/2012 | Kim et al. .................... 382/195 |

OTHER PUBLICATIONS

Sacco et al. "A Privacy Preference Ontology (PPO) for Linked Data" Digital Enterprise Research Institute National University of Ireland, Galway, Ireland Mar. 29, 2011.*

Jason Kincaid, "Google Apps to Get Unified Search in the Not-Too-Distant Future". downloaded from http://techcrunch.com/2010/05/20/google-apps-to-get-unified-search-in-the-not-too-distant-future/ on Jul. 14, 2012.

"Google Unified Search" downloaded from http://www.ghacks.net/2009/07/20/google-unified-search/ on Jul. 14, 2012.

"Find my Face" downloaded from http://support.google.com/plus/bin/answer.py?hl=en&answer=2370300 on Jun. 20, 2012.

"Put on Your Sunglasses! Facial Recognition Is Going Social" downloaded from http://socialmediatoday.com/e-marketing-sensible-folk/278367/facesearch on Nov. 1, 2011.

"Face Recognition Study—FAQ" downloaded from http://www.heinz.cmu.edu/~acquisti/face-recognition-study-FAQ/ on Nov. 1, 2012.

"Google Goggles" downloaded from http://www.google.com/mobile/goggles/#text on Nov. 1, 2011.

"Content-based image retrieval" downloaded from http://en.wikipedia.org/wiki/Content-based_image_retrieval on Jun. 21, 2012.

Tamara L. Berg, et al. "Names and Faces". Preprint submitted to IJCV. U. Cal. at Berkeley, Dept. of Computer Science (undated).

Dan Fredinburg., "Image Theft Detector" Unpublished U.S. Appl. No. 13/475,629, filed May 18, 2012.

"Digital watermarking" downloaded from http://en.wikipedia.org/wiki/Digital_watermarking on Apr. 25, 2012.

"Digital video fingerprinting" downloaded from http://en.wikipedia.org/wiki/Digital_video_fingerprinting on Apr. 25, 2012.

"Exchangeable image file format" downloaded from http://en.wikipedia.org/wiki/Exchangeable_image_file_format on Apr. 25, 2012.

"Google+" downloaded from http://en.wikipedia.org/wiki/Google_%2B on Apr. 25, 2012.

"Sockpuppet (Internet)" downloaded from http://en.wikipedia.org/wiki/Sockpuppet_(Internet) on Apr. 25, 2012.

"Facial recognition system" downloaded from http://en.wikipedia.org/wiki/Facial_recognition_system on May 15, 2012.

Chloe Albaesius, Google+ Photos get Automatic 'Find my Face' Recognition, PC Magazine Dec. 8, 2011 pp. 1-4.

Anonymous, "How about a facial recognition Google Search," downloaded from http://productforums.google.com/forum/ on May 15, 2012.

* cited by examiner

| | | |
|---|---|---|
| 1832 | Indoor habitat factor | Value and weight |
| 1834 | Outdoor habitat factor | Value and weight |
| | | |
| 1840 | Glasses factor | Value and weight |
| 1842 | Facial hair factor | Value and weight |
| 1844 | Head hair factor | Value and weight |
| 1846 | Headwear factor | Value and weight |
| 1847 | Clothing factor | Value and weight |
| 1848 | Eye color factor | Value and weight |
| 1850 | Occurrence information | Value and weight |
| 1852 | Co-occurrences information | Value and weight |
| 1854 | Date information | Value and weight |
| 1856 | Time information | Value and weight |
| 1858 | Location information | Value and weight |
| | ⋮ | ⋮ |

IMAGE SEARCH PRIVACY PROTECTION TECHNIQUES

TECHNICAL FIELD

The subject matter described herein relates to information technology, and, more particularly, to search technologies and the like. More particularly, the subject matter described herein relates to privacy protection features with respect to image search, and related reputation control techniques.

BACKGROUND INFORMATION

A web search engine typically accepts a textual query from a user and searches for information on the World Wide Web. The search results are generally presented in a textual list of results. Search engines also typically maintain real-time information via a so-called web crawler.

Facial recognition software identifies a person from a digital image or the like; for example, by comparing facial features from the image to a facial database.

SUMMARY

Described herein are image search privacy protection techniques. In one aspect, an example method of controlling access to visual query results includes the step of obtaining, by a unified search entity, from a requester, a visual query including at least a first facial image. The unified search entity is an entity that provides at least visual query based web searching and an associated mechanism for expressing privacy preferences. A further step includes identifying, by the unified search entity, via facial recognition on the at least first facial image, of an identity of an individual subject of the at least first facial image and/or at least a second facial image associated with the at least first facial image. The at least second facial image is of the individual subject. Still further steps include obtaining, by the unified search entity, from the individual, via the mechanism for expressing privacy preferences, a plurality of privacy preferences including a visual query preference; and communicating the identity of the individual subject and/or the at least second facial image, from the unified search entity, to the requester, only if permitted by the visual query preference.

In another aspect, another example method of controlling access to visual query results includes the steps of obtaining, by a search entity, from a requester, a visual query including at least a first facial image; and identifying, by the search entity, via facial recognition on the at least first facial image, general web content, from web pages not under control of the search entity. The general web content is associated with an individual subject of the first facial image. Further steps include obtaining, by the search entity, from the individual subject, via a mechanism for expressing privacy preferences, at least one privacy preference including a visual query preference; and communicating at least a portion of the general web content, from the search entity, to the requester, only if permitted by the visual query preference.

In still another aspect, an example method of alerting an entity to use of an image includes the steps of obtaining access to a first database having a plurality of first database records. Each of the first database records includes at least an identification of a corresponding one of a plurality of entities; and a plurality of features of a plurality of images associated with the entities. A further step includes obtaining access to a second database having a plurality of second database records. Each of the second database records includes at least an identification of a corresponding one of a plurality of generalized web locations; and a plurality of features of a plurality of images associated with the generalized web locations. The plurality of features are extracted from images obtained by crawling the generalized web locations. For at least one of the first database records, corresponding ones of the features of a corresponding one of the images associated with a corresponding one of the entities are compared to the plurality of features in the second database records. If the comparing yields a probable match, a given one of the entities, corresponding to the at least one of the first database records, is advised.

In a further aspect, an example method of alerting a person to appearance in a video includes the step of obtaining access to a first database having a plurality of first database records. Each of the first database records includes an identification of a corresponding one of a plurality of humans; and features of a corresponding one of a plurality of photographs associated with the corresponding one of the plurality of humans. Further steps includes deconstructing a plurality of videos into individual frames; extracting features associated with images of human faces contained in the individual frames; and populating a second database with a plurality of second database records. Each of the second database records includes an identifier of a corresponding one of the videos; and corresponding ones of the features associated with the images of the human faces contained in the corresponding one of the videos. For at least one of the first database records, the features of a corresponding one of a plurality of photographs associated with the corresponding one of the plurality of humans are compared to the features in the second database records. If the comparing yields a probable match, the corresponding one of the plurality of humans is advised.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments described herein or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code for performing the method steps indicated. Furthermore, one or more embodiments described herein or elements thereof can be implemented in the form of an apparatus including a memory and at least one processor that is coupled to the memory and operative to perform, or facilitate performance of, example method steps. Yet further, in another aspect, one or more embodiments described herein or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein.

Embodiments described herein can provide substantial beneficial technical effects. For example, in addition to privacy protection and/or reputation control, one or more embodiments narrow the set of images that must be searched.

These and other features and advantages will become apparent from the following detailed description of illustrative embodiments, which is to be read in connection with the accompanying drawings.

BRIEF DESCRIPTION OF THE DRAWINGS

FIG. 13 is a block diagram illustrating some image derived characteristics;

FIG. 16 is a "screen shot" of a dashboard for managing personal alerts, including video posts;

DETAILED DESCRIPTION

Figure 1:
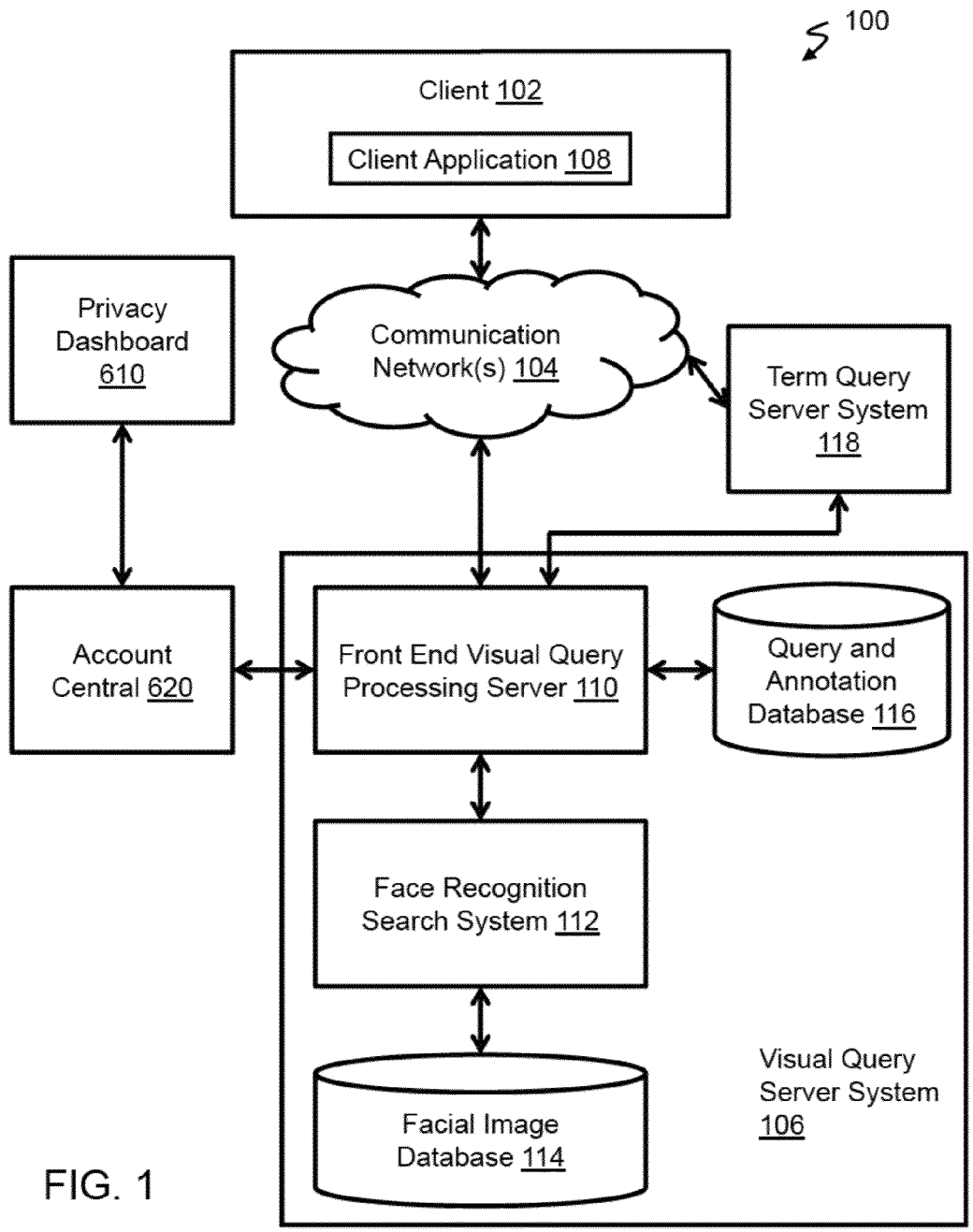
FIG. 1 shows a block diagram illustrating a computer network that includes a visual query server system with a privacy dashboard and a central database of account information.

FIG. 1 is a block diagram of an example embodiment of a computer network that includes a visual query server system and a privacy dashboard. The computer network 100 includes one or more client systems 102 and a visual query server system 106. One or more communications networks 104 interconnect these components. The communications network 104 may be any of a variety of networks, including local area networks (LAN), wide area networks (WAN), wireless networks, wireline networks, the Internet, or a combination of such networks.

The client system 102 includes a client application 108, which is executed by the client system, for receiving a visual query. A visual query is an image that is submitted as a query to a search engine or search system. Examples of visual queries, without limitations include photographs, scanned documents and images, and drawings. The client application 108 could include, for example, a search application, a search engine plug-in for a browser application, and/or a search engine extension for a browser application. Client application 108 may, for example, allow a user to drag and drop any format of image into a search box to be used as the visual query.

Client system 102 sends queries to and receives data from the visual query server system 106. The client system 102 may be any computer or other device that is capable of communicating with the visual query server system 106. Examples include, without limitation, desktop and notebook computers, mainframe computers, server computers, mobile devices such as mobile phones and personal digital assistants, network terminals, and set-top boxes.

The visual query server system 106 includes a front end visual query processing server 110. The front end server 110 receives a visual query from the client 102, and sends the visual query to face recognition search system 112. Optionally, the visual query is sent to a plurality of parallel search systems for simultaneous processing. The face recognition search system 112 implements a distinct visual query search process and accesses the corresponding database 114 as necessary to process the visual query. For example, face recognition search system 112 will access facial image database 114 to look for facial matches to the image query. As will be explained in more detail with regard to FIG. 5, the facial recognition search system 112 will return one or more search results (e.g., names, matching faces, etc.) from the facial image database 114. In an optional approach, a parallel search system, such as an optical character recognition (OCR) search system (not shown) converts any recognizable text in the visual query into text for return as one or more search results. In an optical character recognition (OCR) search system, an OCR database may be accessed to recognize particular fonts or text patterns.

Optionally, any number of parallel search systems may be used. In one or more embodiments, only the face recognition search system 112 and facial image database 114 are used. In one optional approach, the system includes facial recognition search system 112, an OCR search system, an image-to-terms search system (which may recognize an object or an object category), a product recognition search system (which may be configured to recognize 2-D images such as book covers and CDs and may also be configured to recognized 3-D images such as furniture), bar code recognition search system (which recognizes ID and 2D style bar codes), a named entity recognition search system, landmark recognition (which may be configured to recognize particular famous landmarks like the Eiffel Tower and may also be configured to recognize a corpus of specific images such as billboards), place recognition aided by geo-location information provided by a GPS receiver in the client system 102 or mobile phone network, a color recognition search system, and a similar image search system (which searches for and identifies images similar to a visual query). Further search systems can be added as additional parallel search systems. All of the search systems, except the OCR search system, are collectively defined herein as search systems performing an image-match process. All of the search systems including the OCR search system are collectively referred to as query-by-image search systems.

In one or more embodiments, the face recognition search system 112 and its corresponding database 114, and optionally one or more of the other system-database combinations, each individually process the visual search query and return their results to the front end server system 110. The front end server 110 may, for example, perform one or more analyses on the search results such as one or more of: aggregating the results into a compound document, choosing a subset of results to display, and ranking the results. The front end server 110 communicates the search results to the client system 102.

In one or more embodiments, server 110 interacts with account central 620 to determine whether results should be presented to the user of client system 102; user preferences are set and stored in account central database 620 via privacy dashboard 610. The client system 102 presents the one or more appropriate search results to the user. The results may be presented on a display, by an audio speaker, or any other suitable technique used to communicate information to a user. The user may interact with the search results in a variety of ways. Optionally, the user's selections, annotations, and other interactions with the search results are transmitted to the visual query server system 106 and recorded along with the visual query in an optional query and annotation database 116. Information in the query and annotation database can be used to improve visual query results. In some embodiments, the information from the query and annotation database 116 is periodically pushed to the search system 112, which incorporates any relevant portions of the information into the database 114 (if present, parallel search systems and their corresponding databases also incorporate any relevant portions of the information).

The computer network 100 optionally includes a term query server system 118, for performing searches in response to term queries. A term query is a query containing one or more terms, as opposed to a visual query which contains an image. The term query server system 118 may be used to generate search results that supplement information produced by the various search engines in the visual query server system 106. The results returned from the term query server system 118 may include any format. The term query server system 118 may include textual documents, images, video, etc. While term query server system 118 is shown as a separate system in FIG. 1, optionally the visual query server system 106 may include a term query server system 118. The term query server system may employ conventional search engine technology in a well-known manner, including web crawling, indexing results thereof into in an index database, and searching the index database based on textual input terms.

In operation, the visual query server system 106 receives a visual query from a client system 102. The visual query is an image document of any suitable format. For example, the visual query can be a photograph, a screen shot, a scanned image, or a frame or a sequence of multiple frames of a video. In a non-limiting example, a visual query could come from a user taking a photograph of his or her friend on his or her mobile phone and then submitting the photograph as the visual query to the server system. The visual query could also come from a user scanning a page of a magazine, or taking a screen shot of a webpage on a desktop computer and then submitting the scan or screen shot as the visual query to the server system. In some embodiments, the visual query is submitted to the server system 106 through a search engine extension of a browser application, through a plug-in for a browser application, or by a search application executed by the client system 102. Visual queries may also be submitted by other application programs (executed by a client system) that support or generate images which can be transmitted to a remotely located server by the client system.

In some instances, the visual query can be a combination of text and non-text elements. For example, a query could be a scan of a magazine page containing images and text, such as a person standing next to a road sign. A visual query can include an image of a person's face, whether taken by a camera embedded in the client system or a document scanned by or otherwise received by the client system. The visual query can also be an image of numerous distinct subjects, such as a person and an object (e.g., car, park bench, etc.), or person and an animal (e.g., pet, farm animal, butterfly, etc.). In some instances, one visual query will produce two or more distinct search results corresponding to different portions of the visual query.

The front end server system sends the visual query to one or more of the search systems for simultaneous processing. Each search system implements a distinct visual query search process, i.e., an individual search system processes the visual query by its own processing scheme.

In some cases, images of famous landmarks, logos, people, album covers, trademarks, etc. are recognized by an image-to-terms search system. In other embodiments, a distinct named entity query-by-image process separate from the image-to-terms search system is utilized.

The front end server system 110 receives results from the search system or systems 112. In some embodiments, the results are accompanied by a search score. The results may be ranked and/or filtered.

The visual query server system interacts with account central database 620 with user preferences stored therein and sends none, some, or all of the search results to the client system 102 in accordance with the stored user preferences. In a non-limiting example, the results are sent to the client in the form of an interactive results document.

Optionally, the user will interact with the results document by selecting a visual identifier in the results document. The server system receives from the client system information regarding the user selection of a visual identifier in the interactive results document. A suitable link may be activated by selecting an activation region inside a bounding box, a hot button, a label, an underlined word in text, or other representation of an object or subject in the visual query.

The client 102 receives a visual query from a user/querier/requester. In some embodiments, visual queries can only be accepted from users who have signed up for the visual query system. In some embodiments, searches for facial recognition matches are only performed for users who have signed up for the facial recognition visual query system, while other types of visual queries are performed for anyone regardless of whether they have signed up for the facial recognition portion. Regardless of these aspects associated with the person requesting the visual search, search results of a subject of a visual search are only provided in accordance with the subject's expressed privacy preferences.

The format of the visual query can take many forms. Optionally, the client system 102 performs pre-processing on the visual query. After the client 102 performs the optional pre-processing of the visual query, the client sends the visual query to the visual query server system 106, specifically to the front end visual query processing server 110. Where available, the client may pass along information regarding the results of the pre-processing. For example, the client may indicate that the face recognition module is 75% sure that a particular sub-portion of the visual query contains a face. More generally, the pre-processing results, if any, include one or more subject type values (e.g., bar code, face, text, etc.).

The front end server 110 receives the visual query from the client system and sends same to one or more search systems 112, optionally together with the aforementioned preprocessing information that may be received from the client 102 in some instances.

Figure 2:
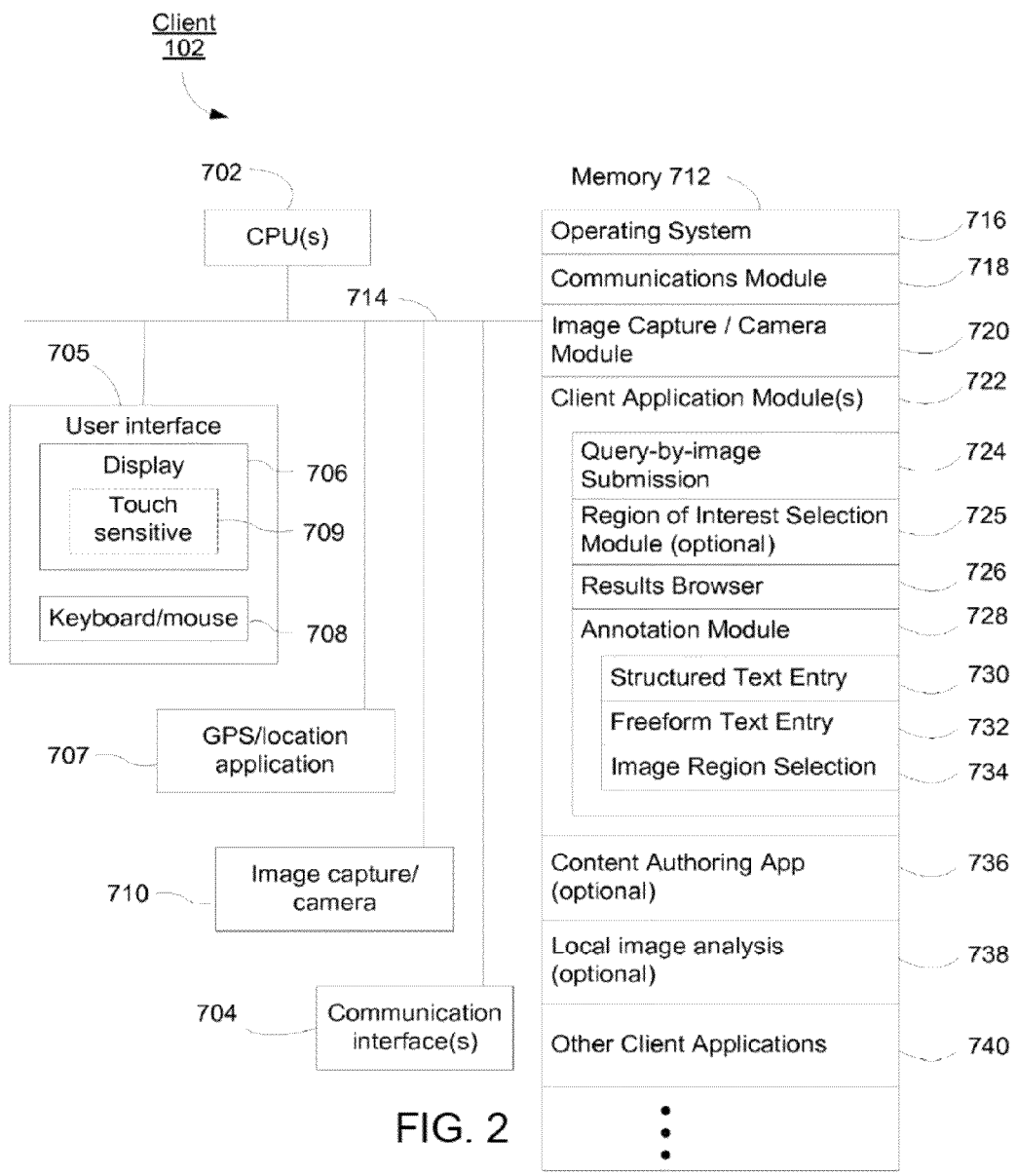
FIG. 2 shows a block diagram illustrating a client system.

FIG. 2 is a block diagram illustrating a non-limiting example embodiment of a client system 102. The client system 102 typically includes one or more processing units (CPUs) 702, one or more network or other communications interfaces 704, memory 712, and one or more communication buses 714 for interconnecting these components. The client system 102 includes a user interface 705. The user interface 705 includes a display device 706 and optionally includes an input device such as a keyboard, mouse, or other input buttons 708. Alternatively or in addition the display device 706 includes a touch sensitive surface 709, in which case the display 706/709 is a touch sensitive display. In client systems that have a touch sensitive display 706/709, a physical keyboard is optional (e.g., a soft keyboard may be displayed when keyboard entry is needed).

Furthermore, some client systems use a microphone and voice recognition to supplement or replace the keyboard. Optionally, the client 102 includes a GPS (global positioning satellite) receiver, or other location detection apparatus 707 for determining the location of the client system 102. In some embodiments, visual query search services are provided that make appropriate use of the client system 102 providing the visual query server system with location information indicating the location of the client system 102.

The client system 102 also includes an image capture device 710 such as a camera or scanner. Memory 712 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 712 may optionally include one or more storage devices remotely located from the CPU(s) 702.

In some embodiments, one or more of the following programs, modules and data structures are provided:

- an operating system 716 that includes procedures for handling various basic system services and for performing hardware dependent tasks;
- a network communication module 718 that is used for connecting the client system 102 to other computers via the one or more communication network interfaces 704 (wired or wireless) and one or more communication networks, such as the Internet, other wide area networks, local area networks, metropolitan area networks, and so on;
- a image capture module 720 for processing a respective image captured by the image capture device/camera 710, where the respective image may be sent (e.g., by a client application module) as a visual query to the visual query server system;
- one or more client application modules 722 for handling various aspects of querying by image, including but not limited to: a query-by-image submission module 724 configured to submit visual queries to the visual query server system; optionally a region of interest selection module 725 that detects a selection (such as a gesture on the touch sensitive display 706/709) of a region of interest in an image and prepares that region of interest as a visual query; a results browser 726 for displaying the results of the visual query; and optionally an annotation module 728 with optional modules for structured annotation text entry 730 such as filling in a form or for freeform annotation text entry 732, which can accept annotations from a variety of formats, and an image region selection module 734 (sometimes referred to herein as a result selection module) which allows a user to select a particular sub-portion of an image for annotation;
- an optional content authoring application(s) 736 that allow a user to author a visual query by creating or editing an image rather than just capturing one via the image capture device 710; optionally, one or more such applications 736 may include instructions that enable a user to select a sub-portion of an image for use as a visual query;
- an optional local image analysis module 738 that pre-processes the visual query before sending it to the visual query server system. The local image analysis may recognize particular types of images, or sub-regions within an image. Examples of image types that may be recognized by such modules 738 include one or more of: facial type (facial image recognized within visual query), bar code type (bar code recognized within visual query), and text type (text recognized within visual query); and
- additional optional client applications 740 such as an email application, a phone application, a browser application, a mapping application, instant messaging application, social networking application etc. In some embodiments, the application corresponding to an appropriate actionable search result can be launched or accessed when the actionable search result is selected.

Optionally, the image region selection module 734 which allows a user to select a particular sub-portion of an image for annotation, also allows the user to choose a search result as a "correct" hit without necessarily further annotating it. For example, the user may be presented with a top N number of facial recognition matches and may choose the correct person from that results list. For some search queries, more than one type of result will be presented, and the user will choose a type of result. For example, the image query may include a person standing next to a tree, but only the results regarding the person is of interest to the user. Therefore, the image selection module 734 allows the user to indicate which type of image is the "correct" type—i.e., the type he is interested in receiving. The user may also wish to annotate the search result by adding personal comments or descriptive words using either the annotation text entry module 730 (for filling in a form) or freeform annotation text entry module 732.

Note that blocks not labeled as "optional" in FIG. 2 may nevertheless be optional in other embodiments.

Figure 3:
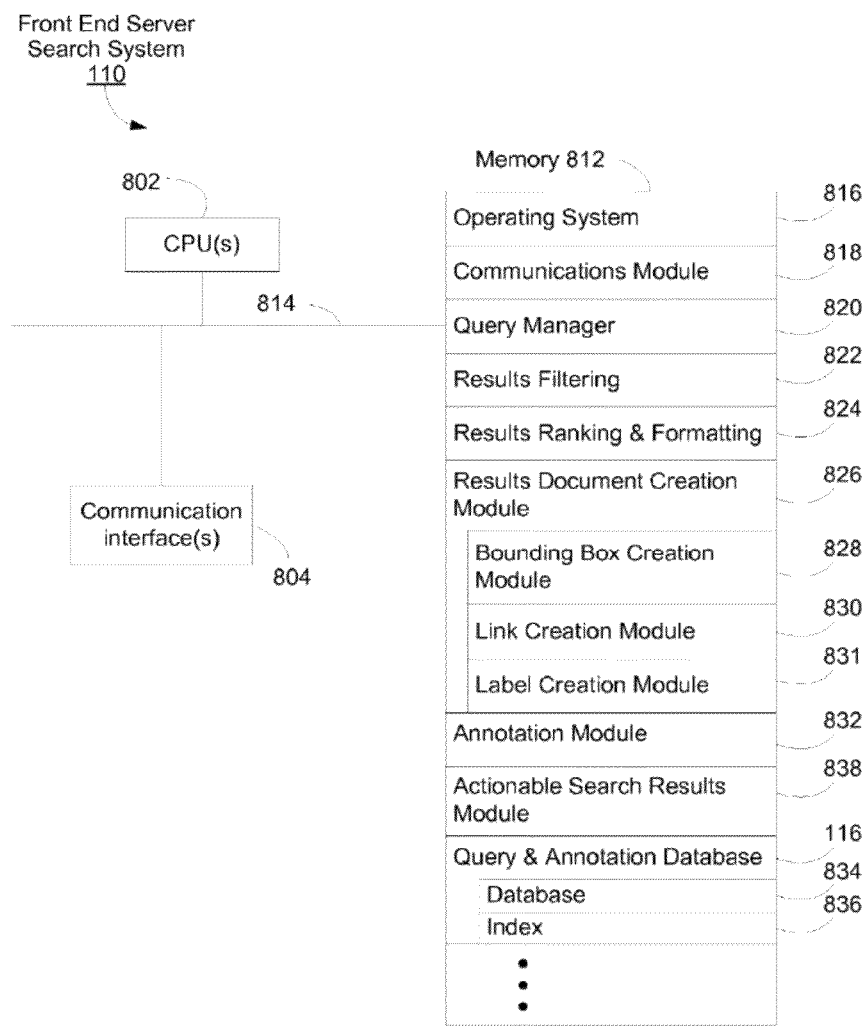
FIG. 3 shows a block diagram illustrating a front end visual query processing server system.

FIG. 3 is a block diagram illustrating a non-limiting example embodiment of a front end visual query processing server system 110. The front end server 110 typically includes one or more processing units (CPUs) 802, one or more network or other communications interfaces 804, memory 812, and one or more communication buses 814 for interconnecting these components. Memory 812 includes high speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 812 may optionally include one or more storage devices remotely located from the CPU(s) 802.

In some embodiments, one or more of the following programs, modules and data structures are provided:

- an operating system 816 that includes procedures for handling various basic system services and for performing hardware dependent tasks;
- a network communication module 818 that is used for connecting the front end server system 110 to other computers via the one or more communication network interfaces 804 (wired or wireless) and one or more communication networks, such as the Internet, other wide area networks, local area networks, metropolitan area networks, and so on;

a query manager 820 for handling the incoming visual queries from the client system 102 and sending them to one or more search systems;

a results filtering module 822 for optionally filtering the results from the one or more parallel search systems and sending the top or "relevant" results to the client system 102 for presentation, if consistent with expressed privacy preferences from privacy dashboard 610;

a results ranking and formatting module 824 for optionally ranking the results from the one or more parallel search systems and for formatting the results for presentation;

a results document creation module 826, is used when appropriate, to create an interactive search results document; module 826 may include sub-modules, including but not limited to a bounding box creation module 828 and a link creation module 830;

a label creation module 831 for creating labels that are visual identifiers of respective sub-portions of a visual query;

an annotation module 832 for receiving annotations from a user and sending them to an annotation database 116;

an actionable search results module 838 for generating, in response to a visual query, one or more actionable search result elements, each configured to launch a client-side action; examples of actionable search result elements are buttons to initiate a telephone call, to initiate an email message, to map an address, to make a restaurant reservation, and to provide an option to purchase a product; and a query and annotation database 116 which includes the database itself 834 and an index to the database 836.

The results ranking and formatting module 824 ranks the results returned from the one or more search systems 112. In cases where several types of search results may be relevant, in some embodiments, the results ranking and formatting module 824 ranks all of the results from the search system having the most relevant result (e.g., the result with the highest relevance score) above the results for the less relevant search systems. In other embodiments, the results ranking and formatting module 824 ranks a top result from each relevant search system above the remaining results. In some embodiments, the results ranking and formatting module 824 ranks the results in accordance with a relevance score computed for each of the search results. For some visual queries, augmented textual queries are performed in addition to the searching on parallel visual search systems. In some embodiments, when textual queries are also performed, their results are presented in a manner visually distinctive from the visual search system results.

The results ranking and formatting module 824 also formats the results. In some embodiments, the results are presented in a list format. In some embodiments, the results are presented via an interactive results document. In some embodiments, both an interactive results document and a list of results are presented. In some embodiments, the type of query dictates how the results are presented. For example, if more than one searchable subject is detected in the visual query, then an interactive results document is produced, while if only one searchable subject is detected the results will be displayed in list format only.

The results document creation module 826 is used to create an interactive search results document. The interactive search results document may have one or more detected and searched subjects. The bounding box creation module 828 creates a bounding box around one or more of the searched subjects. The bounding boxes may be rectangular boxes, or may outline the shape(s) of the subject(s). The link creation module 830 creates links to search results associated with their respective subject in the interactive search results document. In some embodiments, clicking within the bounding box area activates the corresponding link inserted by the link creation module.

The query and annotation database 116 contains information that can be used to improve visual query results. In some embodiments, the user may annotate the image after the visual query results have been presented. Furthermore, in some embodiments the user may annotate the image before sending it to the visual query search system. Pre-annotation may help the visual query processing by focusing the results, or running text based searches on the annotated words in parallel with the visual query searches. In some embodiments, annotated versions of a picture can be made public (e.g., when the user has given permission for publication, for example by designating the image and annotation(s) as not private), so as to be returned as a potential image match hit. For example, if a user takes a picture of a flower and annotates the image by giving detailed genus and species information about that flower, the user may want that image to be presented to anyone who performs a visual query research looking for that flower, and this can be done in accordance with the user's expressed consent. In some embodiments, the information from the query and annotation database 116 is periodically pushed to the search system 112, which incorporates relevant portions of the information (if any) into database 114 (if present, parallel search systems and their corresponding databases also incorporate any relevant portions of the information).

Figure 5:
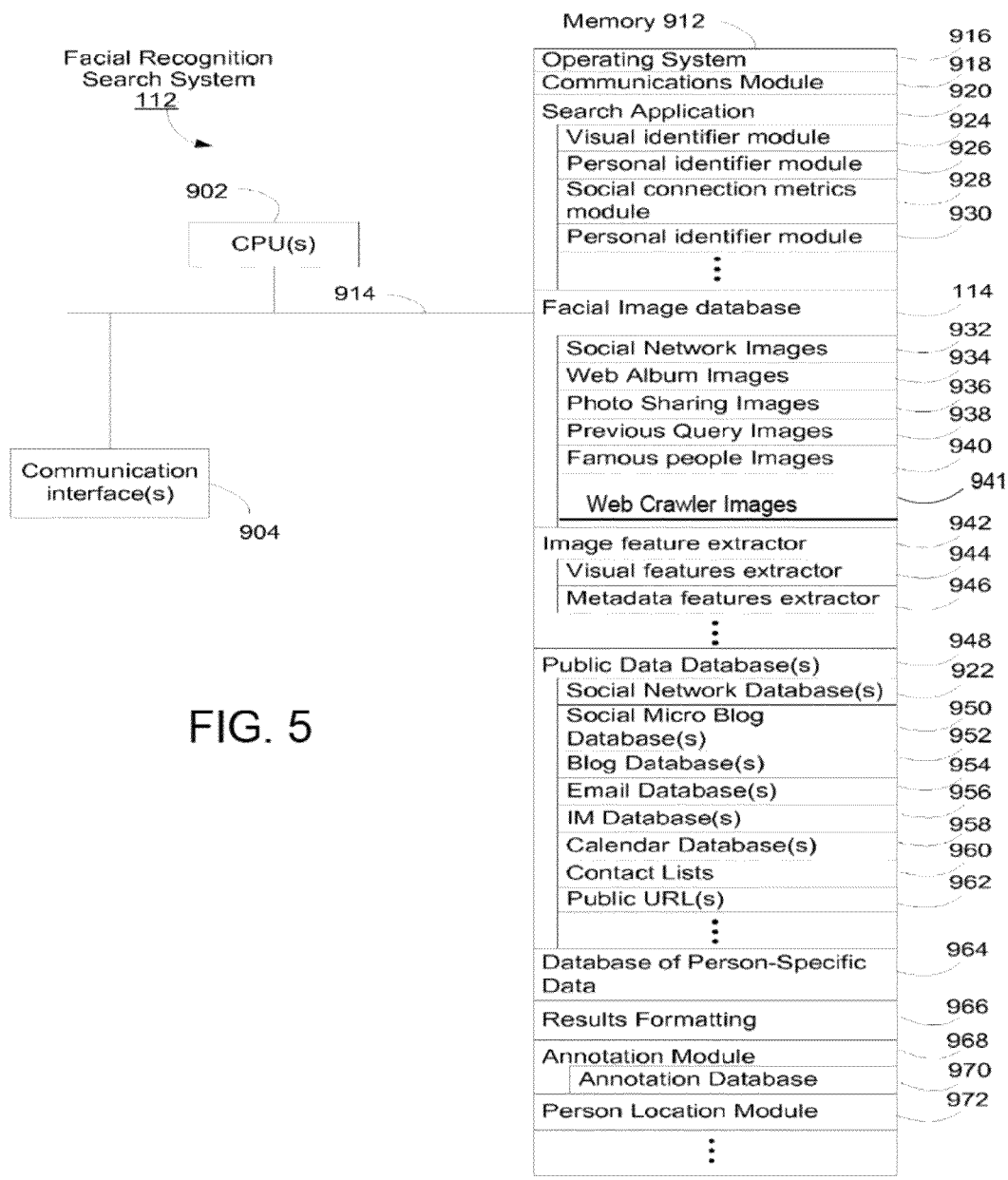
FIG. 5 shows a block diagram illustrating a facial recognition search system utilized to process a visual query.

FIG. 5 is a block diagram illustrating a non-limiting example embodiment of a facial recognition search system 112 utilized to process a visual query with at least one facial image. The facial recognition search system 112 typically includes one or more processing units (CPUs) 902, one or more network or other communications interfaces 904, memory 912, and one or more communication buses 914 for interconnecting these components. Memory 912 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 912 may optionally include one or more storage devices remotely located from the CPU(s) 902.

In some embodiments, one or more of the following programs, modules and data structures are provided:

An operating system 916 that includes procedures for handling various basic system services and for performing hardware dependent tasks.

A network communication module 918 that is used for connecting the facial recognition search system 112 to other computers via the one or more communication network interfaces 904 (wired or wireless) and one or more communication networks, such as the Internet, other wide area networks, local area networks, metropolitan area networks, and so on.

A facial recognition search application 920 including a visual identifier module 924 configured to identify potential image matches that potentially match a facial image in the query, a personal identifier module 926 for identifying persons associated with the potential image matches, and optionally a social connection metrics module 928 for retrieving person-specific data including metrics of social connectivity to the requester (and/or another person in the image)(if in accordance with the expressed privacy preferences of the individual(s) concerned), and a ranking module 930 for generating a ranked list of identified persons in accordance with metrics of visual similarity between the facial image and the potential matches (optionally, also in accordance with social connection metrics).

A facial image database 114, which is searched to find the images that potentially match a facial image in a query, includes one or more image sources such as social network images 932, web album images 934, photo sharing images 936, and previous query images 938. In some instances, the image sources used in response to a particular query are identified in accordance with data regarding the requester. In some cases, they include only images in accounts belonging to or associated with the requester, such as social networking accounts of the requester, web albums of the requester, and so on. In other cases the sources include images belonging to or associated with other people with whom the requester is socially connected, e.g., people with a direct connection to a requester on a social graph. Optionally, the facial image database 114 includes images of famous people 940. In some embodiments, the facial image database includes facial images obtained from external sources, such as vendors of facial images that are legally in the public domain. In one or more embodiments described herein, the images include images 941 obtained from a crawl of generalized web content, as described elsewhere herein; optionally, any one, some or all of the other images 932-940 are also present.

An image feature extractor 942 extracts characteristics derived from images in the facial image database 114 and stores the information in a database of person-specific data 964. In some embodiments, visual characteristics such as an indoor habitat factor, an outdoor habitat factor, a glasses factor, a facial hair factor, a head hair factor, a headwear factor, an eye color factor, occurrence information, and co-occurrence information are extracted with a visual features extractor 944. In some embodiments, metadata characteristics such as date information, time information, and location information are extracted with a metadata features extractor 946.

Public databases 948 are sources of person-specific data, which include connection metrics of social connectivity between the person associated with a potential image match and the requester. The data is obtained from a plurality of applications including, but are not limited to, social network databases 922, social microblog databases 950, blog databases 952, email databases 954, IM (instant messaging) databases 956, calendar databases 958, contact lists 960, and/or public URLs (uniform resource locators) 962.

A database of person-specific data 964 stores information specific to particular persons. Some or all of the person-specific data is obtained from public databases.

A results formatting module 966 formats the results for presentation; in some embodiments, the formatted results include the potential image matches and subset of information from the database of person-specific data 964.

An annotation module 968 receives annotation information from an annotation database (116, FIG. 1), determines if any of the annotation information is relevant to the facial recognition search system, and stores any determined relevant portions of the annotation information into the respective annotation database 970.

A person location module 972 acquires location information concerning the current location of the requester and one or more persons identified as potential matches to a facial image in a visual query.

Privacy dashboard 610 and account central 620 are examples of components that may be employed to ensure that use of the above-mentioned data (e.g., person-specific data, location data) is carried out in accordance with expressed privacy preferences of the individuals concerned.

Figure 8:
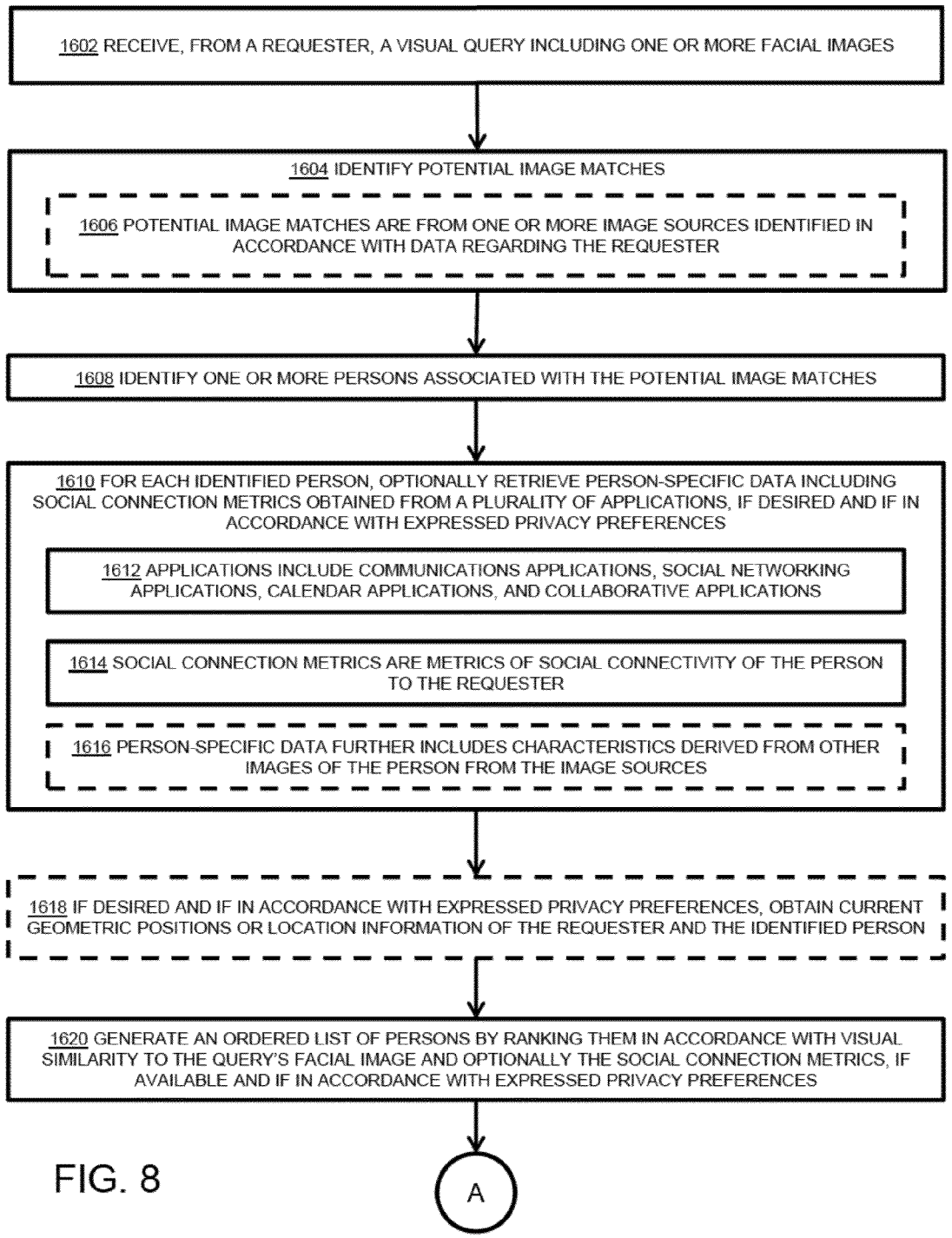
FIGS. 8 and 9 are flowcharts illustrating the process of responding to a visual query including a facial image.
Figure 9:
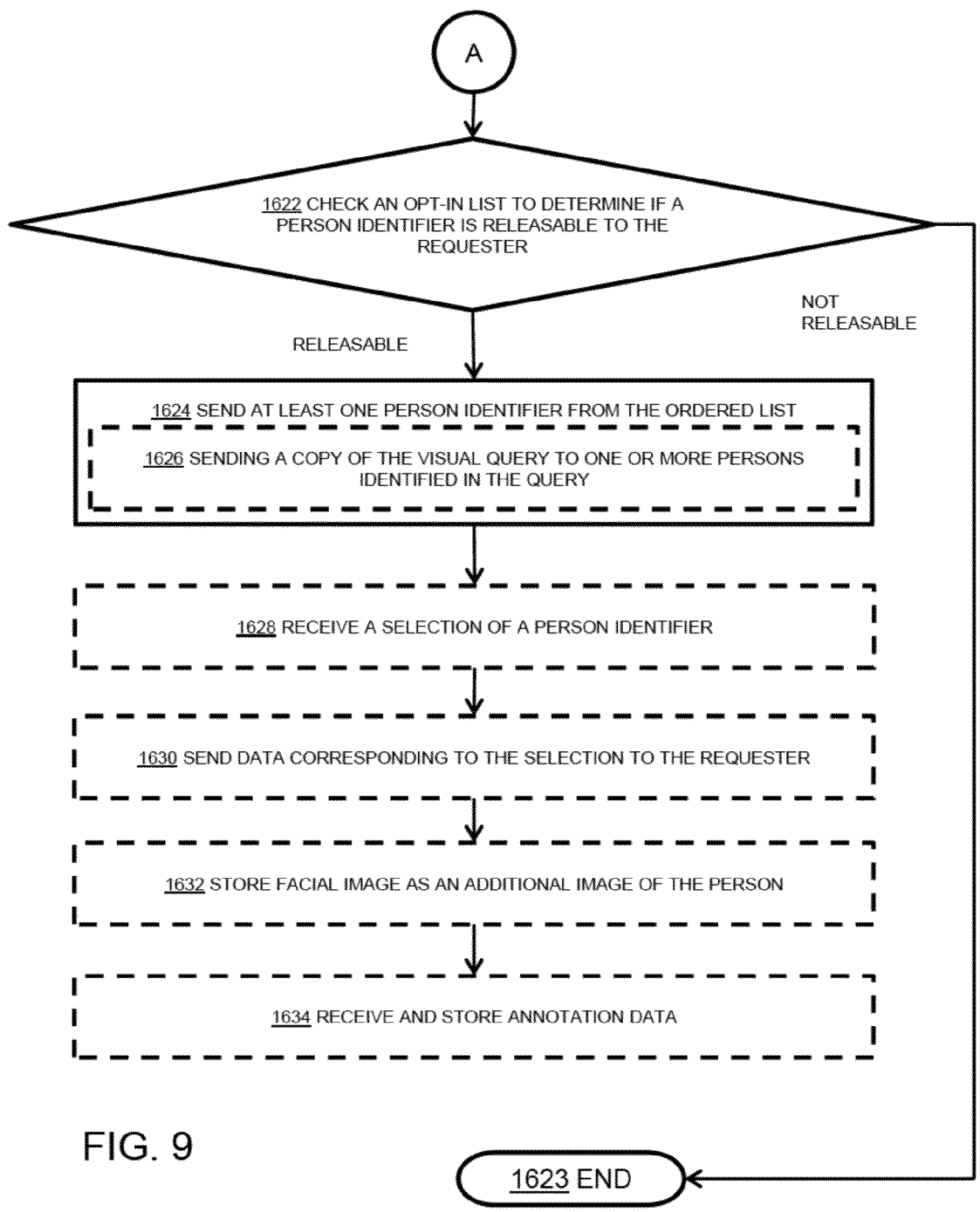

FIGS. 8 and 9 are flowcharts illustrating a process of responding to a visual query including a facial image, in accordance with a non-limiting example embodiment. Facial recognition search system 112 receives, from a requester, a visual query with one or more facial images in it, as at 1602. In some instances, the fact that the visual query contains at least one face is determined by the front end visual query processing server 110. In other words, when a visual query is processed by facial recognition search system 112, at least a portion of the visual query image has been determined to contain a potential face. In some circumstances, the visual query contains a plurality of faces, such as a picture of two or more friends, or a group photo of several people. In some cases where the visual query includes a plurality of facial images, the requester may only be interested in one of the faces. As such, in some embodiments when the visual query includes at least a respective facial image and a second facial image, prior to identifying potential image matches, the system receives a selection of the respective facial image from the requester. For example, in some embodiments the system identifies each potential face and requests confirmation regarding which face(s) in the query the requester wishes to have identified.

Images that potentially match a respective facial image are identified, as at 1604, using facial recognition techniques that are, in and of themselves, well known. These images are called potential image matches. The potential image matches are identified in accordance with visual similarity criteria. Optionally, the potential image matches are identified from one or more image sources identified in accordance with data regarding the requester 1606. In some embodiments, data regarding the requester is obtained from a requester's profile information. In some embodiments, the requester's profile information is obtained from the requester directly. Alternatively, or in addition, the requester's profile information is received from a social network. The potential image matches include images that are tagged, i.e., images that include personal identifiers for the person or persons in the images. In some embodiments, the one or more image sources include images from a requestor's social networking database(s), web album(s), photo sharing database(s), and other sources of images associated with the requester. Furthermore, in some embodiments, a database 940 of images of famous people is also included in the image sources searched for potential image matches. In some embodiments, the image sources searched for potential image matches also include images from the requestor's friends' or contacts' social networking database(s), web album(s), photo sharing database(s), and other sources of images associated with the requester. In embodiments that include images from a requestor's friends' or contacts' databases, a determination of which databases to include is made. For example, in some embodiments, databases of a pre-determined maximum number of friends or contacts are included. In other embodiments, databases of only direct social networking friends are included.

As noted above, in one or more embodiments disclosed herein, a search is made of generalized web content 941.

Then, one or more persons associated with the potential image matches are identified, as at 1608. In some embodiments, the one or more persons are identified from personal identifier tags associated with the identified image matches. For example, the system may identify that Bob Smith, Joe Jones, and Peter Johnson are persons associated with potential image matches for a query including an image of a male friend because these three people were tagged in other images associated with the requestor, and these three people are visually similar to the facial image in the query.

For each identified person, person-specific data is optionally retrieved, if desired and if in accordance with expressed privacy preferences. In some cases, this person-specific data includes social connection metrics obtained from a plurality of applications, as at step 1610. The plurality of applications includes communication applications, social networking applications, calendar applications, and collaborative applications, as at step 1612. For example, the applications may include applications such as social networking applications, micro-blogging applications, e-mail and/or instant messaging applications, web calendars, blogs, personal public URLs, and/or any contact lists associated with them. In some embodiments, data is obtained only from "public" published information on these applications. In other embodiments, data is obtained if it belongs to or has been explicitly shared with the requestor. In some embodiments, the person-specific data includes name, address, occupation, group memberships, interests, age, hometown, personal statistics, and work information for the respective identified person. In some embodiments, this information is gleaned from one or more of the above mentioned applications.

In some embodiments, the person-specific data includes social connection metrics, which are metrics of social connectivity between the respective identified person and the requester, as at step 1614. In some embodiments, the social connectivity metrics include metrics of social connectivity over one or more of the above mentioned applications. For example, the social connectivity metrics may take into account one or more of: whether the respective identified person and the requestor are friends on a social networking website, the quantity (if any) of email and/or IM messages exchanged by the requestor and the respective identified person, whether the requester and the respective identified person follow each other's social micro-blog posts, etc.

In some embodiments, the person-specific data for a respective identified person also includes characteristics derived from other images of the respective person, as at step 1616. In some embodiments, these characteristics include metadata information from the images such as date information, time information, and location information. In other embodiments, the characteristics derived from other images of the respective person include visual factors such as an indoor habitat factor, an outdoor habitat factor, a glasses factor, a facial hair factor, a head hair factor, a headwear factor, and an eye color factor. In yet other embodiments, characteristics derived from other images of the respective person include occurrences information regarding an amount of occurrences of the respective person in the one or more image sources, and/or information regarding an amount of co-occurrences of the respective person and with a second person in images from the one or more image sources.

Optionally, the current location information for the requester and current location information for a respective identified person are obtained, as at 1618, by person location module 972. For example, the current location of either the requester or the respective identified person may be obtained from a GPS receiver located in a mobile device, from an IP address of desktop device used by the person, from a home address or work address or the person, or from a published location of the person (such as, "I am currently at a conference in Boston").

Then, an ordered list of persons is generated by ranking the one or more identified persons in accordance with one or more metrics of visual similarity between the respective facial image and the potential image matches and optionally also in accordance with ranking information such as the social connection metrics, as in step 1620. These and other factors affecting the ranking are discussed in more detail below with respect to FIG. 10.

The process continues as shown in FIG. 9. An opt-in list is checked (or other appropriate consultation with the expressed privacy preferences is conducted) and a determination is made as to whether one or more person identifiers are releasable to the requester, as at 1622. If not, at 1623, the process ends without providing any data to the requester. In some embodiments, this check is done when the potentially matching image(s) are from a source other than the requester's own account(s), or when the requestor's own accounts do not contain tagged images of the respective identified person.

Then, if the check in step 1622 is affirmative, the requester is sent at least one person identifier from the ordered list, as at step 1624, thereby identifying one or more persons. In some embodiments, the person identifier is a name. In other embodiments, the person identifier is a handle, email address, nickname or the like. In some embodiments, a representative picture, such as a profile picture, an image of the identified person that best matches the visual query is sent along with the person identifier. In such embodiments, when more than one person is identified as a potential match, a representative picture of each identified person is sent along with the response to the image query. In some embodiments, additional information such as contact information, or a snippet of a recent public post is also sent with the person identifier. In other embodiments, in addition to the person identifier, the connection found between the requester and the person in the image is also returned. For example, a ranked result of Joe Smith, could include the statement "Joe Smith is listed as a contact in more than one of your accounts," or "You and Joe Smith are both members of the Palo Alto Tennis Club" or "You and Joe Smith are both friends with Jane Doe." Further information such as the person's contact information, group affiliations, the names of the people in-between the requester and the person in the matched image according to the social graph may be included in the results returned to the requester if in accordance with the expressed privacy preferences of the individual who is the subject of the person identifier. In some embodiments, the augmented information presented to the requester is explicitly or implicitly specified by the requester (e.g., by configuration values in his or her profile, or by parameters in the visual query, or by the type of the visual query). In some embodiments, when more than one person identifier is sent to the requester, more information is provided for the top ranked identified persons than for the lower ranked identified persons.

In some embodiments, a copy of the visual query (or portion of the query with the respective facial image) is also sent with the one or more person identifiers, as at 1626. When more than one facial image was in the original visual query and one or more facial images are positively identified, in some embodiments, a copy of the visual query is also sent to one or more of the identified people in the visual query. Thus, if a group photo is taken, and multiple people want copies of it, the requester does not to have find contact information for them and manually send them a copy of the photograph. In some embodiments, a requester must first verify that copies should be sent to one or more of the identified people before they are sent.

In some embodiments, a selection of a personal identifier is received from the requester, as at 1628. Then, in response to the selection, data corresponding to the selected person identifier is sent to the requester, as at 1630. In some embodiments this data includes one or more images associated with the person identifier, contact information associated with the person identifier, public profile information associated with the person identifier, etc., if in accordance with the expressed privacy preferences of the individual who is the subject of the person identifier. In some embodiments, the requester is given the option to store some or all of this information in the requester's contact list, or to update the requester's contact information for the identified person. In some embodiments, the information is associated with the requestor's visual query, or the portion of the query with the facial image corresponding to the person identifier is stored with contact list information.

Furthermore, in some embodiments, the facial image of the visual query is stored as an additional image of a respective person corresponding to the selected person identifier, as at step 1632. In some embodiments, the image is stored in a previous queries portion of the image sources 938. In some embodiments, the requester is given an opportunity to annotate the image to include additional data. In instances where annotation data is entered by the requester, it is received and stored, as at step 1634, by facial recognition search system 112. The annotation module 968 accepts annotations to improve future facial recognition searches. For example, if the user annotates a picture of a person with the name of that person, that picture might be used in future facial recognition queries to recognize the person. In some embodiments, for privacy reasons, the additional annotated pictures of a person may be used by facial recognition search system 112 to augment the facial recognition process but are not returned as an image result to anyone but the original requester. In some embodiments, only the actual person identified in the visual query is allowed to make an image public (or available to people other than the requester). In some embodiments, once the person is positively identified, a request is sent to that person asking him or her if he or she will allow the image to be returned as a result for future queries for people within his or her social network.

In some embodiments, more than one image of the same person may be retrieved at step 1604. Once the potential matching images are retrieved and it is determined that the images are of the same person, which may be done by noting that the images both have the same personal ID, same or similar personal-specific data (name, address, and the like) or have the same or similar social connections, the images will be associated with the same data and treated like a single unit for the rest of the processing steps. Optionally, if two or more images are returned with the same person identifier in step 1624, more than one retrieved image for the same person identifier is returned in the response to the image query.

Figure 10:
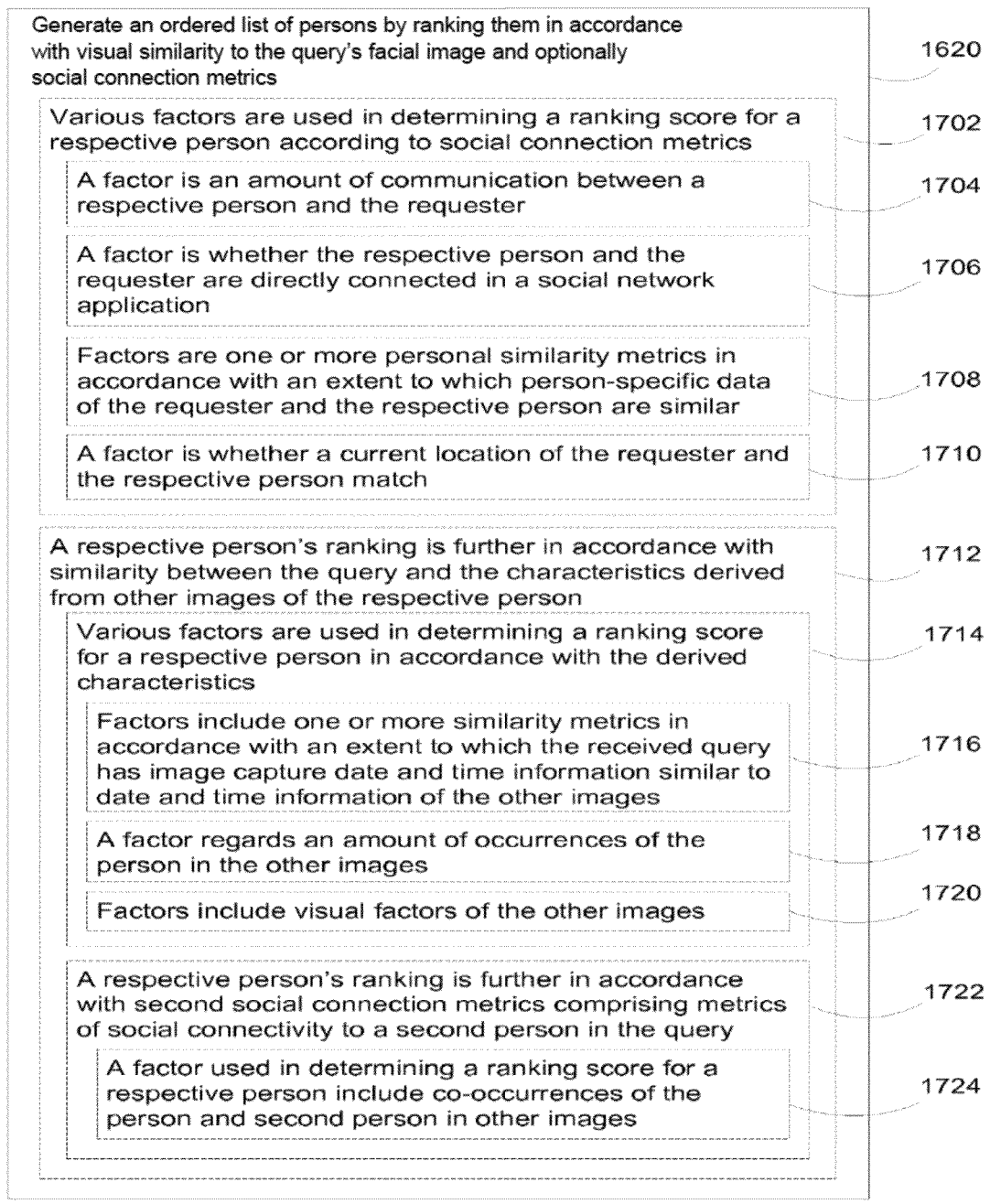
FIG. 10 is a flowchart illustrating various factors and characteristics used in generating an ordered list of persons that potentially match a facial image in a visual query.

FIG. 10 is a flowchart illustrating non-limiting example factors and characteristics used in generating an ordered list of persons that potentially match a facial image in a visual query. This flowchart provides more information regarding step 1620, discussed above.

In some embodiments, various factors are used in determining a ranking score for a respective person in the ordered list of persons according to the social network connection metrics, as at step 1702. In some embodiments, the amount of communication between a respective person and the requester on the one or more communication applications is determined, and then a ranking score for the respective person, is determined. A factor in determining the ranking score for the respective person is the determined amount of communication between the respective person and the requester on the one or more communication applications, as shown at 1704. The communications applications may include social networking applications, social micro-blogs, email applications, and/or instant messaging applications. For example, if a respective person has communicated extensively with the requester by one or more communications applications (e.g., extensive communications by email and social network posts), then the requestor is likely to know the respective person quite well and thus the facial image in the visual query is more likely to be the respective person. In some embodiments, this factor is only used when the amount of communication is above a pre-determined threshold (e.g., a set number of communications, a number of communications within a certain period of time, or a percentage of the total communications). In some embodiments, facial recognition search system 112 determines whether the amount of communication between the respective person and the requester on the one or more communication applications exceeds a threshold, and a factor in determining the ranking score for the respective person is the determination of whether the amount of communication between the respective person and the requester on the one or more communication applications exceeds the threshold.

In some embodiments, a determination of whether the requester and a respective person are directly connected in a respective social networking application is made, and then a ranking score for the respective person is determined. A factor in determining the ranking score for the respective person is the determination of whether the requester and the respective person are directly connected in a respective social networking application, as shown at step 1706. For example, if the requester and the respective person are directly connected as friends, then the requestor is likely to know the respective person quite well and thus the facial image in the visual query is more likely to be the respective person.

In cases where the person-specific data for the respective person includes a plurality of characteristics, such as two or more of: name, address, occupation, group memberships, interests, age, hometown, personal statistics, and/or work information for the respective person, the same information is also retrieved for the requester, to the extent that such information is available to facial recognition search system 112. Then one or more personal similarity metrics are determined in accordance with an extent to which the person-specific data of the requester is similar to the person-specific data of the respective identified person. A ranking score for the respective identified person is determined, wherein one or more factors in determining the ranking score for the respective identified person are the one or more personal similarity metrics, as shown at step 1708. For example, if the requester and the respective person are of similar age, similar occupation, and are members of similar groups, they are more likely to be friends and thus the facial image in the visual query is more likely to be the respective person.

In circumstances where the current location information for both the requester and the identified person are successfully obtained, a ranking score for the respective identified person is determined. A factor in determining the ranking score for the respective identified person is whether current location information for the requester matches the current location information for the respective identified person, as shown at step 1710. For example, when both the requester and the respective person are determined to be at the same location, the proximity of the requester and the respective person increases the likelihood that the facial image in the visual query is the respective person. Furthermore, when the requester and the respective person are determined not to be at the same location, the lack of proximity greatly decreases the likelihood that the facial image in the visual query is the respective person. In some cases, a history or log of locations for both the requester and the identified person are retrieved and compared with each other for a match. In some embodiments, the location logs of the requester and identified person are further compared with a location (and/or date and time) characteristic derived from the query image itself. For example, if the query location information indicates the image was taken July 2 in Santa Cruz, Calif., and the logs of locations for both the requester and the identified person also indicate that they were in Santa Cruz, Calif. on July 2, then this location match increases the likelihood that the facial image in the visual query is that of the respective person.

In embodiments where the person-specific data for a respective person also includes characteristics derived from other images of the respective person (which was discussed with respect to step 1616), the ranking is further in accordance with similarity between the received query and the characteristics derived from other images of the respective person, as shown at step 1712. Various factors are used in determining the ranking score for a respective person, in accordance with the characteristics derived from other images of the respective person, as shown at step 1714.

In some embodiments, the characteristics derived from other images of the respective person include image capture date (e.g., day of week, day or month, and/or full date) and time information. Then, one more similarity metrics are determined in accordance with an extent to which the received query has image capture date and time information similar to the date and time information of one or more other images of the respective person. A ranking score for the respective person is determined, wherein one or more factors in determining the ranking score for the respective person are the one or more similarity metrics, as at step 1716. In some embodiments, the similarity metric is a Boolean value (e.g., yes/no or 1/0). In other embodiments, a similarity metric is a vector of Boolean values (e.g., same date yes/no, within 1 hr yes/no, within 5 hrs yes/no, etc.). The similarity metric can be a numeric value (e.g., between 0 and 1) that measures the similarity. In some embodiments the similarity metric is determined for each other image of the respective person, but in some embodiments a group value for all of the images of the respective person is determined. In some embodiments, another characteristic derived from the images is place/location information, which can be used as an additional or alternative similarity metric. For example, if the visual query has similar date, time, and/or location information as one or more other images, that similarity increases the likelihood that the facial image in the visual query is the respective person who was in the one or more other images having similar date, time, and/or location information.

In some instances, the characteristics derived from other images of the respective person include occurrences information regarding the amount of occurrences of the respective person in images from the one or more image sources. In some of these embodiments, a factor in determining the ranking score for the respective person is the occurrences information for the respective person, as shown at step 1718. For example, if numerous other images include the respective person, then the requestor is likely to know the respective person quite well, which increases the likelihood that the facial image in the visual query is that of the respective person.

In some embodiments, the characteristics derived from other images of the respective person include visual factors such as one or more of: an indoor habitat factor, an outdoor habitat factor, a glasses factor, a facial hair factor, a head hair factor, a headwear factor, a clothing factor, and an eye color factor. In some of these embodiments, one or more factors in determining the ranking score for the respective person include the visual factors for the respective person, as shown at step 1720.

In some situations, the visual query includes a plurality of facial images. When more than one facial image is in the visual query, then interconnections between the facial images can be helpful in identifying the facial images correctly. For example, if the facial images have strong social connection metrics or appear in other images together, those facts increase the likelihood that they are together in the query image as well. In some embodiments, the visual query includes at least a respective facial image and a second facial image. Images (herein called potential second image matches) that potentially match the second facial image in accordance with visual similarity criteria are identified. The potential second image matches are images from one or more image sources identified in accordance with data regarding the requester. Then a second person associated with the potential second image matches is identified. For purposes of this determination, it is assumed that the second person is identified with a high degree of certainty. For each identified person identified as a potential match to the respective facial image, person-specific data that includes second social connection metrics of social connectivity to the second person are obtained from the plurality of applications. Then, an ordered list of persons is generated by ranking the one or more identified persons further in accordance with ranking information that includes at least the second social connection metrics. As such, a respective person's ranking is further in accordance with second social connection metrics including metrics of social connectivity to a second person in the query, as shown at step 1722. In other words, in some embodiments, both social connections to the requester and social connections to the second person are used in generating the ordered list of persons.

In other embodiments, one or more of the other factors discussed above are compared between the second person and each person identified as a potential match to find a best match. For example, if the second person and a respective person are employed at the same company, appear in other images that have similar date/time information, or communicate extensively with each other, then these factors can be used in identifying him or her correctly. In another example, characteristics derived from other images of the respective person include information regarding an amount of co-occurrences of the respective person and the second person in images from the one or more image sources; and when a ranking score for the respective person is determined, a factor in determining the ranking score for the respective person is the amount of co-occurrences of the person and the second person in images from the one or more image sources, as shown at step 1724.

It should be noted that one or more embodiments disclosed herein are directed to instances where generalized web content is searched; in such cases, information regarding the social connection metrics and other factors in FIG. 10 may be limited or unavailable and visual similarity may be the sole, or a key, ranking factor.

Figure 11:
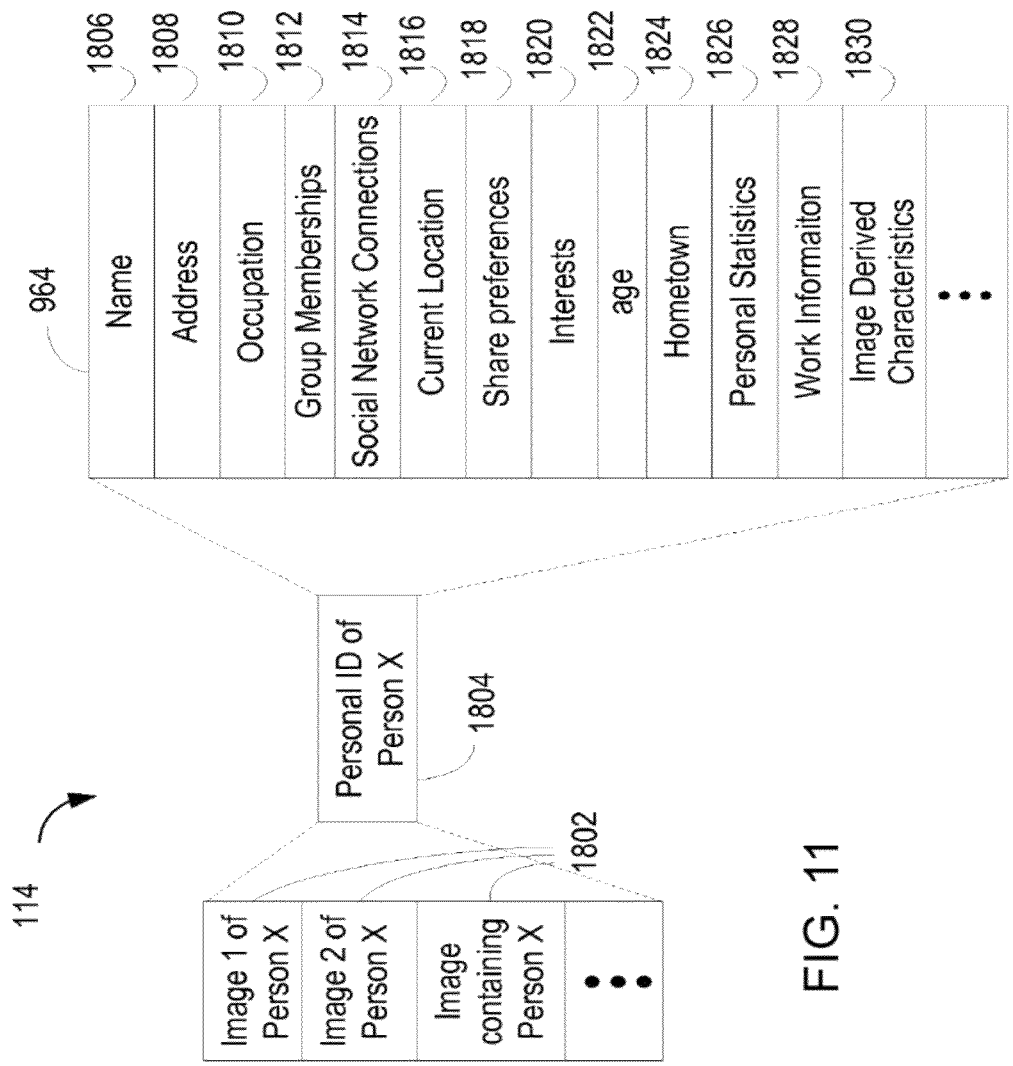
FIG. 11 is a block diagram illustrating a portion of the data structure of a facial image database utilized by a facial recognition search system.

FIG. 11 is a block diagram illustrating a portion of the data structure of a facial image database 114 utilized by facial recognition search system 112. In a non-limiting example embodiment, the facial image database contains one or more images of a person 1802 obtained from one or more images sources identified in accordance with data regarding the requester. In some embodiments, facial image database 114 also contains a unique ID 1804, or person identifier, for the person. Additional information regarding the person is associated with the person identifier 1804 and is stored in a database of person-specific data 964. Some or all of the additional information is then used in determining potential matches for a facial image in a visual query. For example, an ordered list of identified persons associated with potential image matches is generated by ranking the persons in accordance with metrics of social connectivity to the requester, such as matching group memberships 1812 or strong social connections 1814. Data from the database of person specific data 964 is used in addition to the potential image being visually similar to the facial image in the visual query when determining an ordered list of identified persons. The database of person specific data 964 may include, but is not limited to, any of the following items for the person identified by the unique ID 1804: name 1806, address 1808, occupation 1810, group memberships 1812, social network connections 1814 (explained in more detail with regard to FIG. 12), current location 1816, share preferences 1818, interests 1820, age 1822, hometown 1824, personal statistics 1826, and work information 1828. This information is obtained from a plurality of applications such as communication applications, social networking applications, calendar applications, and collaborative applications. In some embodiments, the person-specific data also includes characteristics derived from one or more images of the person, as shown at 1830 and as discussed with respect to FIG. 13.

Figure 12:
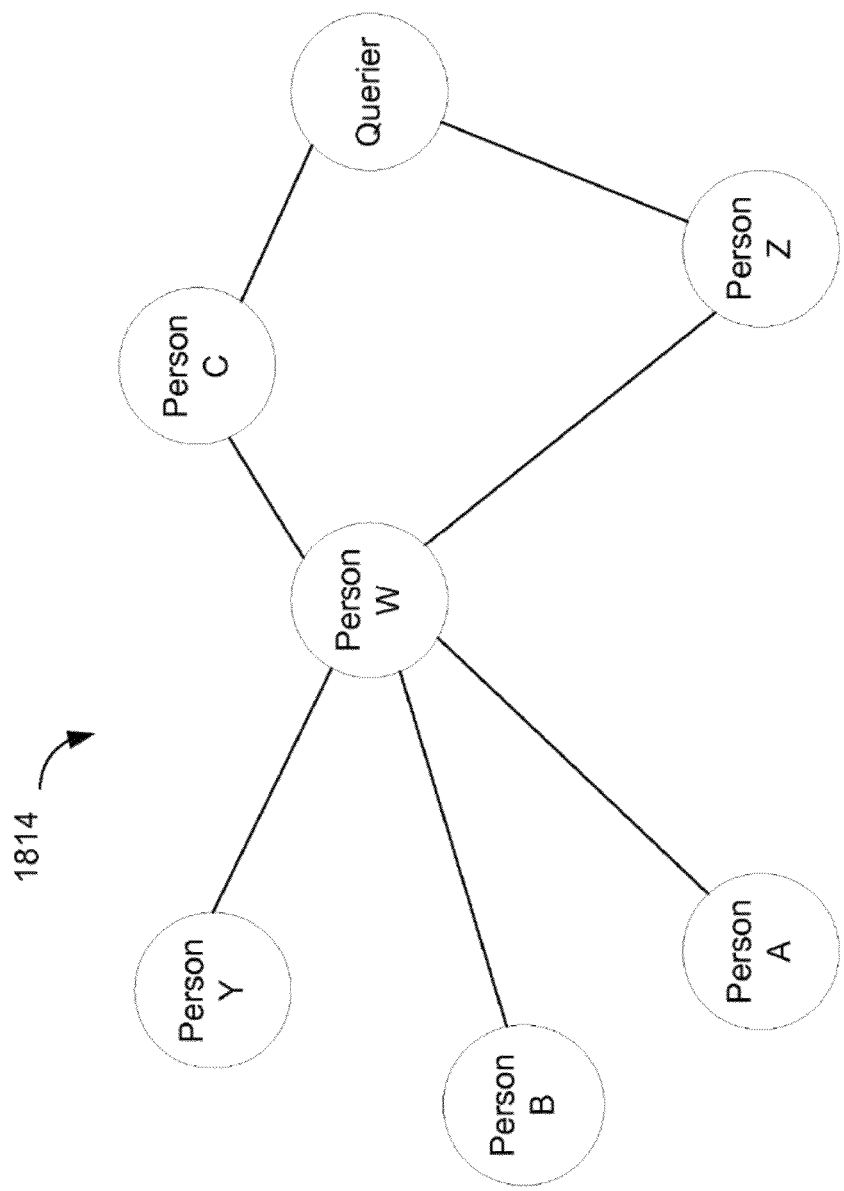
FIG. 12 illustrates relationships between people across a plurality of applications such as social network and communication applications.

FIG. 12 illustrates an example of social network connections 1814. In some embodiments, person-specific data for an identified person includes social connections metrics of social connectivity to the requester (identified as the querier in FIG. 12) which are obtained from a plurality of applications. The lines between the people in this figure (Querier, A, B, C, W, Y, and Z) represent one or more of their social connections to each other (such as a connection by email, instant message, and social networking website.) In some embodiments, the social distance between two people is used as a factor in determining a ranking score for the potential image matches. For example, if one potential matching image was an image of Person C and another potential matching image was an image of Person Y, in some embodiments, the potential matching image of Person C would receive a higher social connectivity ranking factor (to be used in computing a ranking score) than Person Y, because, ignoring all other factors, it is more likely that the requester was taking a picture of someone directly connected to the requester (Person C) than of someone three social network "hops" away (Person Y). Similarly, Person W would receive a higher social connectivity ranking factor than Person A since Person W is two social network "hops" away from the requester, whereas Person A is three social network "hops" away from the requester. In some embodiments, the social network connections for a requester are also used to determine which image sources to search in responding to the requester's visual query. For example, in some cases, images in accounts belonging to people with a direct social network connection are included in the image sources searched for images matching a facial image in the visual query, while images in accounts belonging to persons who do not have a direct social network connection to the requester are not included in the image sources searched for images matching a facial image in the visual query.

For some visual queries, other information from the database of person-specific data 964 of FIG. 11 is used in conjunction with the distance or "hops" on a social network connections graph of FIG. 12. For example, if the requester and the respective person live near one another, if they work in the same industry, are in the same social network "groups," and if both have mobile devices that are currently at the same location (as measured by, for example, GPS receivers in their mobile devices), the ranking score of the respective person may still be high even though that respective person is several "hops" away from the requester on a social network connections graph. In another example, if the respective person in a potential matching image is only one "hop" away from the requester on a social network connections graph, that respective person might be ranked high even despite a weak connection determined through the database of person-specific data 964 (such as both people being members of a large group membership).

Again, it should be noted that one or more embodiments disclosed herein are directed to instances where generalized web content is searched; in such cases, information regarding the social connectivity in FIG. 12 may be limited or unavailable and visual similarity may be the sole, or a key, ranking factor.

In some embodiments, the requester can identify certain information from the database of person-specific data 964 as being more important than other information from the database of person-specific data 964. For example, the requester might specify that information concerning the industry in which a person works be given higher weight than other person-specific data, because the requester is attending a work-related function and thus query images are likely to include facial images of other people working in the same industry as the requester. In another example, the requester might specify that information concerning age be given higher weight than other person-specific data, because the requester is submitting query images from a party (or other function) attended by people who are all or primarily of the same age.

FIG. 13 is a block diagram illustrating some image derived characteristics 1830, which are derived from images of each person associated with the requester. In some embodiments, these derived characteristics (derived from at least one image of the person) are stored by person identifier in a database. These derived characteristics include one or more of (and typically two or more of): indoor habitat factor 1832, an outdoor habitat factor 1834, a glasses factor 1840, a facial hair factor 1842, a head hair factor 1844, a headwear factor 1846, clothing factor 1847, an eye color factor 1848, as well as occurrences information regarding an amount of occurrences of the respective person in the one or more image sources 1850, and information regarding an amount of co-occurrences of the respective person and with various additional people in images from the one or more image sources, as shown at 1852. In some embodiments, the derived characteristics also include metadata information from the images such as date information 1854, time information 1856, and location information 1858 for each image. Each derived characteristic 1830, derived from other images of a respective person, is given a value and a weight which is used in determining the ranking score for a respective person when that derived characteristic is used.

It will be appreciated that some people may not want to be found via an image and/or facial recognition search. Conversely, some people may want to be found. One or more embodiments described herein advantageously allow users to express privacy preferences with regard to allowing an image and/or facial recognition search to be performed on them. In a non-limiting example, if the target of the search has an account in a social networking and/or identity service, or an employee directory site with a photo added to his or her privacy center, he or she can indicate a "no photo search." When someone else (search requester) does a search, the search is done in the background. The search routine first checks the privacy preferences, at which point any photos of a person who has not affirmatively expressed a desire to participate, even if present in the index, are not returned as a search result to the search requester. For the avoidance of doubt, in one or more embodiments, results of an image and/or facial recognition search are not provided to a requester unless the subject of the search (photographed person) takes action at some point (before or after) to consent to the provision of the search results to the requester. Stated in another way, in one or more embodiments, no action is required by an individual for his or her privacy to be protected with regard to image searching; results are suppressed unless the individual consents in some manner.

Thus, in a social networking database there may be pictures of an individual which have been tagged with his or her first and last name. For any person using such a social networking database, even intermittently, there may well be about, say, 5-20 photos. This social networking database provides the information linking a face and a name. One or more embodiments may be used in conjunction with a downloadable image recognition application 108 which can be downloaded to a smart phone or other portable/handheld electronic device. Such application can be used, for example, for searches based on pictures taken by handheld devices. For example, a picture of something or someone can be taken with a mobile phone camera and then uploaded to system 106 which will carry out image recognition analysis on the picture and search for the corresponding person, place, or thing. In some cases, the results are the same as if a textual search was run on the person, place, or thing; for example, searching on a picture of the Eiffel Tower will return the same results as entering the text "Eiffel Tower" in system 118.

One or more embodiments advantageously provide user privacy controls. Person A, who does not want to be found via an image search, is enabled to set a flag which indicates that if Person B uploads a picture of Person A from client 102 to system 106, system 106 is not to reply back to client 102 with the results of other tagged photos of Person A.

Currently, in a typical social networking site, users can control who is able to see what photos associated with a given user via the use of groups for sharing (e.g., friends, family, acquaintances, work colleagues, etc.) and/or access control lists. This affords privacy between groups of people on a particular social networking web site, and with respect to non-users of the social networking web site accessing the social networking web site from the web. However, in current systems, a social networking web site user cannot control what images of himself or herself are visible to others on the web in general; for example, people using a general-purpose search engine that provides image recognition capability.

Advantageously, one or more embodiments disclosed herein extend the control that social network site users have to the general web.

Figure 6:
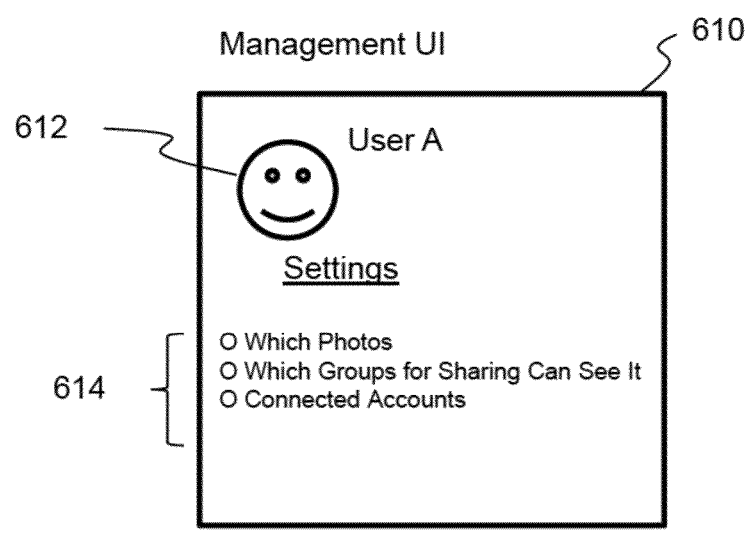
FIG. 6 shows details of the management user interface for the privacy dashboard shown in FIG. 1.
Figure 7:
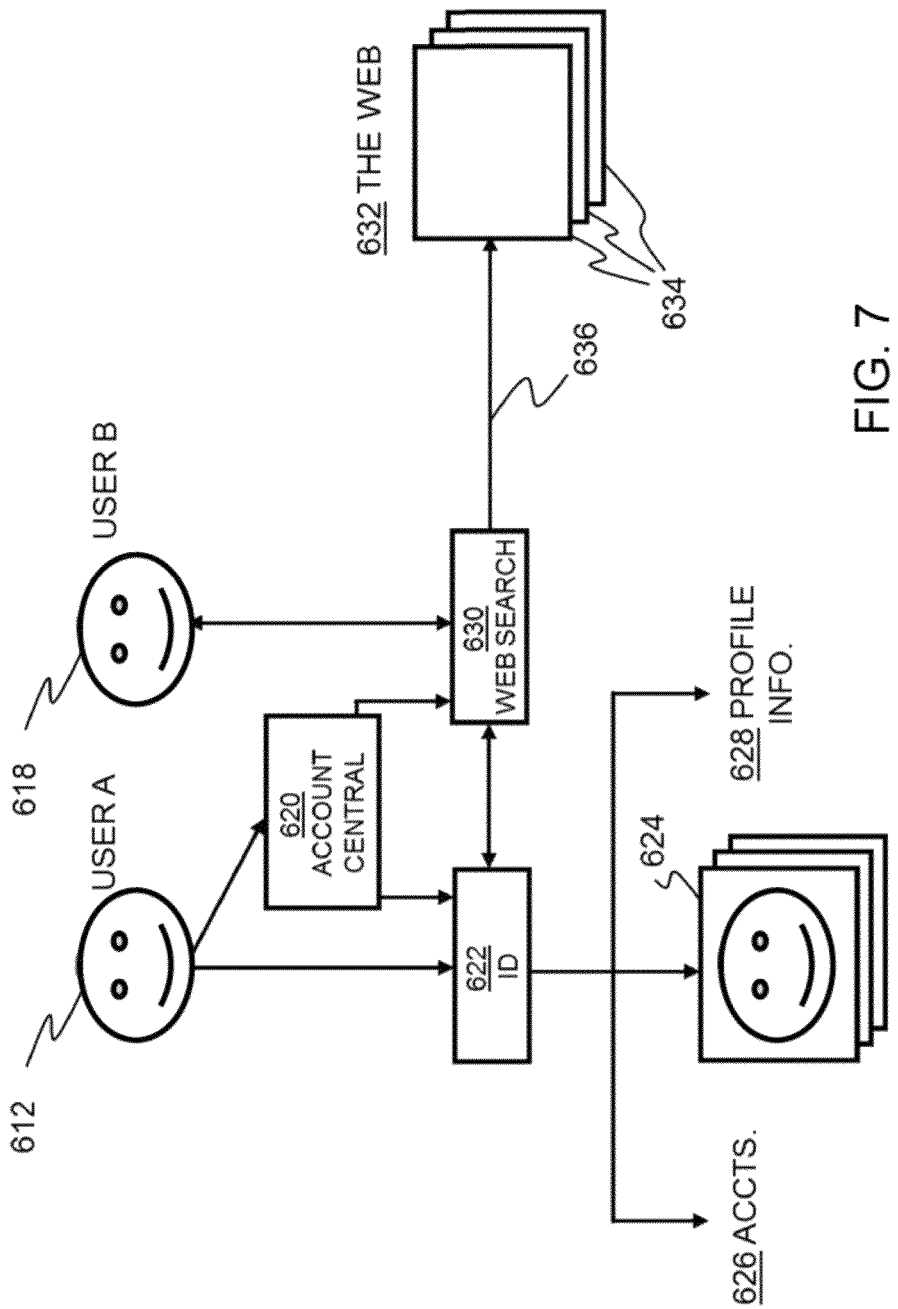
FIG. 7 shows a block diagram of an image search privacy protection mechanism.

Referring now to FIGS. 6 and 7, consider a first non-limiting example case, including User A 612 and User B 618. User A accesses a unified privacy dashboard 610 via a management user interface (UI) as shown in FIG. 6. User B is a user of a search service who is currently anonymous; that is, he or she does not have an account with the entity that provides the dashboard 610, or else is not currently logged in. In some instances, a single entity ("unified search entity") provides at least visual query based web searching and an associated mechanism for expressing privacy preferences. In a non-limiting example, the unified search entity provides and/or operates the dashboard 610 and system 106, optionally system 118, and optionally, a social networking site, e-mail, and/or a photo-sharing site. User A has an account with this unified search entity, or has at least chosen to access UI 610 and make one or more privacy selections. User B snaps a photo of User A in public. User B uploads the photo from his or her client device 102, to system 106, to do a reverse-image search, trying to find User A's name, and/or other images of user A. User A has used the unified privacy dashboard 610 present in his or her social network (or other) account settings with the unified search entity to express a preference not to permit web search 630 provided by the given entity to return results of images and/or content of User A to anyone who is not both: (i) logged-in and (ii) in one or more of User A's social networking groups for sharing. User B gets no results for the search in this first non-limiting example search.

Consider now a second non-limiting example case, wherein User B decides to log in to his or her social networking or other account, provided by the unified search entity, and re-perform the search. Suppose User B is not in any of User A's social networking groups for sharing. User B gets a result back indicating (at User A's choice; User A may also simply forbid all sharing of search results):

An indication that User A exists, but has chosen not to allow searches from people not in the groups for sharing;

Content from a "the whole web" group for sharing that User A has granted permission for (this content may or may not exist on properties of the unified search entity); or An option to request to User A to be added to a group for sharing.

User A gets a notification (setting can be toggled in some cases) that a search was performed on him or her from a person who is not in one of his or her groups for sharing.

One or more embodiments thus advantageously operate on a reciprocity principle, to discourage cyber-stalking or unbalanced access to information.

Still with reference to FIGS. 6 and 7, with respect to Management UI 610, one or more embodiments employ an entity-wide privacy dashboard which simplifies the privacy settings for all of the different products offered by a given entity, such as the unified search entity, in a single place. This will make it easier for users such as User A, designated as 612, to be clear as to how they wish to treat their privacy. Dashboard UI 610 allows user 612 to specify who to share content with, to specify marketing preferences, and the like. Examples of these kinds of settings are shown at 614.

In one or more embodiments, image search privacy control for the general web, and not merely for social networking, is included on the privacy UI 610 as another setting. As mentioned briefly above, in one scenario, the assumption is that User A, designated as 612, is a user that has a social networking profile, or has at least used interface 610 to express one or more privacy preferences to an entity such as the unified search entity; and User B, designated by reference character 618, is someone who is just searching through a web search facility 630 (e.g., systems 106 and/or 118) but is not currently logged in, and it is thus not known whether User B has a social networking profile. User B may, for example, just have the basic search cookie. Suppose User B has a photo of User A and User B wants to try to find out who User A is and learn about him or her. User B will upload that photo from client 102 to system 106. Based on that, if User A has a social networking profile with a photo on it which is tagged and present in database 114, facial recognition is applied with system 112 and a determination is made that the two images are of the same person. At that point, a search can be done on the person identified by the tag (User A, say, John Smith). The tag can be the basis for a conventional web search or an enhanced search as described above.

User A, in Management UI 610, may provide an indication that search results are to be suppressed for searchers, such as User B in this example, who are anonymous. That is, when User B is not logged in, and attempts to do an image search, nothing will be returned. However, User A may want to allow his friends who are in his group(s) for sharing on a social networking site to be able to find him on the web. Then, if User B logs in, and is also in one of User A's groups for sharing, then whatever User B has been granted permission to see based on membership in User A's group for sharing will show up in the search result. "Groups for sharing" refer to people defined by a user of a social networking site to be in certain groups, for example, work colleagues, friends, family, and each person can be in one or more of those groups.

Again, in one or more embodiments, the web search 630 and account central 620/dashboard 610 are operated by or on behalf of a single entity such as the unified search entity, and User A has an account with the unified search entity or has at least expressed privacy preferences to the unified search entity via dashboard 610 for storage in account central 620.

In some instances, User B may be logged on and may be a "friend" of User A or in one or User A's designated groups for sharing, and may be allowed to see all results. Sometimes User B may log in using a fake persona. This is common behavior for cyber stalkers, bullies, fraudsters, hackers, and other interne miscreants. However, in one or more embodiments described herein, a "default deny" base rule applies (unless User A has shared his or her profile publicly), and therefore User A must grant access to specific known people. Any fake profile therefore will not have access.

Again, one or more embodiments employ the concept of reciprocity; it is not fair for an anonymous user to see everything about Person X but for Person X not to know what is being queried about him or her. Thus, if User B, doing the search, chooses to log in and also has a social networking profile, then he or she is permitted to see more; furthermore, User A gets a notification that the search was performed, and is asked if he or she wants to see who was looking for him or her. This helps to discourage bad behavior online, e.g., cyber bullying, which typically occurs when there is an imbalance of power and people can get away with such behavior due to anonymity.

Continuing with FIGS. 6 and 7, in one or more embodiments, Management UI 610 provides an interface to account central 620, and is used by User A to determine the behavior of the system. Thus, account central 620 may be a database where appropriate settings are stored. ID block 622 may include, for example, a unique code for each registered user, which code may be partially bound to the user's ID. Associated with the ID and/or unique code are attached photos of the person 624, associated accounts 626 on other web sites, profile data 628, and the like. User A's ID provides a link to all the things shown, i.e. accounts 626, pictures 624, and/or profile(s) 628.

Web search 630 includes functionality such as described with respect to systems 106 and 118, extended, as seen at 636, to the general web 632 including a plurality of HTML pages 634 or the like (including on-line content not owned by the unified search entity).

Thus, User B tries to use web search 630 to search the web 632 and the results that User B will obtain are based on User A's preferences, as expressed through Management UI 610 and stored in account central 620, as well as the log-in status of User B. Default behavior may be specified for cases where User B is not logged in and is searching anonymously. Furthermore, it is also possible to specify that additional things should be allowed to happen, based on User A's preferences, when User B logs in. Yet further, in one or more embodiments, if User A has expressed no preference at any time, the default is to suppress image search results that return images of User A.

Given the discussion thus far, it will be appreciated that, in general terms, an example method of controlling access to visual query results, according to an aspect of the invention, includes the step of obtaining, by a unified search entity, from a requester (e.g., User B 618 using a client 102), a visual query including at least a first facial image. The unified search entity provides at least visual query based web searching (e.g., via servers 110, 112) and an associated mechanism for expressing privacy preferences (e.g., the unified privacy dashboard 610). A further step includes identifying, by the unified search entity, via facial recognition on the at least first facial image, of the identity of an individual subject (e.g., User A 612) of the at least first facial image and/or at least a second facial image associated with the at least first facial image; the at least second facial image is of the individual subject (e.g., a photo of User A 612). A still further step includes obtaining, by the unified search entity, from the individual (e.g., User A 612), via the mechanism for expressing privacy preferences (e.g., the unified privacy dashboard 610), a plurality of privacy preferences including a visual query preference. An even further step includes communicating the identity of the individual subject and/or the at least second facial image, from the unified search entity, to the requester, only if permitted by the visual query preference. Various example privacy options that can be selected by User A are discussed above.

Furthermore, given the discussion thus far, it will be appreciated that, in general terms, an example method of controlling access to visual query results, according to another aspect of the invention, includes the step of obtaining, by a search entity, from a requester (e.g., User B 618 using a client 102), a visual query including at least a first facial image. A further step includes identifying, by the search entity, via facial recognition on the at least first facial image, general web content 632, from web pages not under control of the search entity. The general web content is associated with an individual subject of the first facial image (e.g., User A 612). A still further step includes obtaining, by the search entity, from the individual subject (e.g., User A 612), via a mechanism for expressing privacy preferences (e.g., the unified privacy dashboard 610), at least one privacy preference including a visual query preference. An even further step includes communicating at least a portion of the general web content, from the search entity, to the requester, only if permitted by the visual query preference. Again, various example privacy options that can be selected by User A are discussed above.

In some instances, the identifying includes identifying the individual subject by performing facial recognition to compare the at least first facial image to a database of stored images (e.g., images 624) linked to corresponding people (the individual subject is one of the corresponding people); and identifying the general web content by carrying out a term-based general web search on the individual subject's name. In some such instances, the database of stored images is under control of the search entity.

In some instances, the identifying includes identifying includes performing facial recognition to compare the at least first facial image to an index database of general web content, obtained by a crawler. The index database of general web content includes facial image data for comparison with the at least first facial image during the facial recognition. Aspects of a visual web crawler 1907 are discussed below in connection with other embodiments but can also be utilized in this embodiment.

As discussed above, in some embodiments, an additional step includes determining, by the search entity, whether the requester has logged in. In such cases, the visual query preference specifies different treatment for the communication of the general web content, from the search entity, to the requester, depending on whether the requester has logged in.

Figure 17:
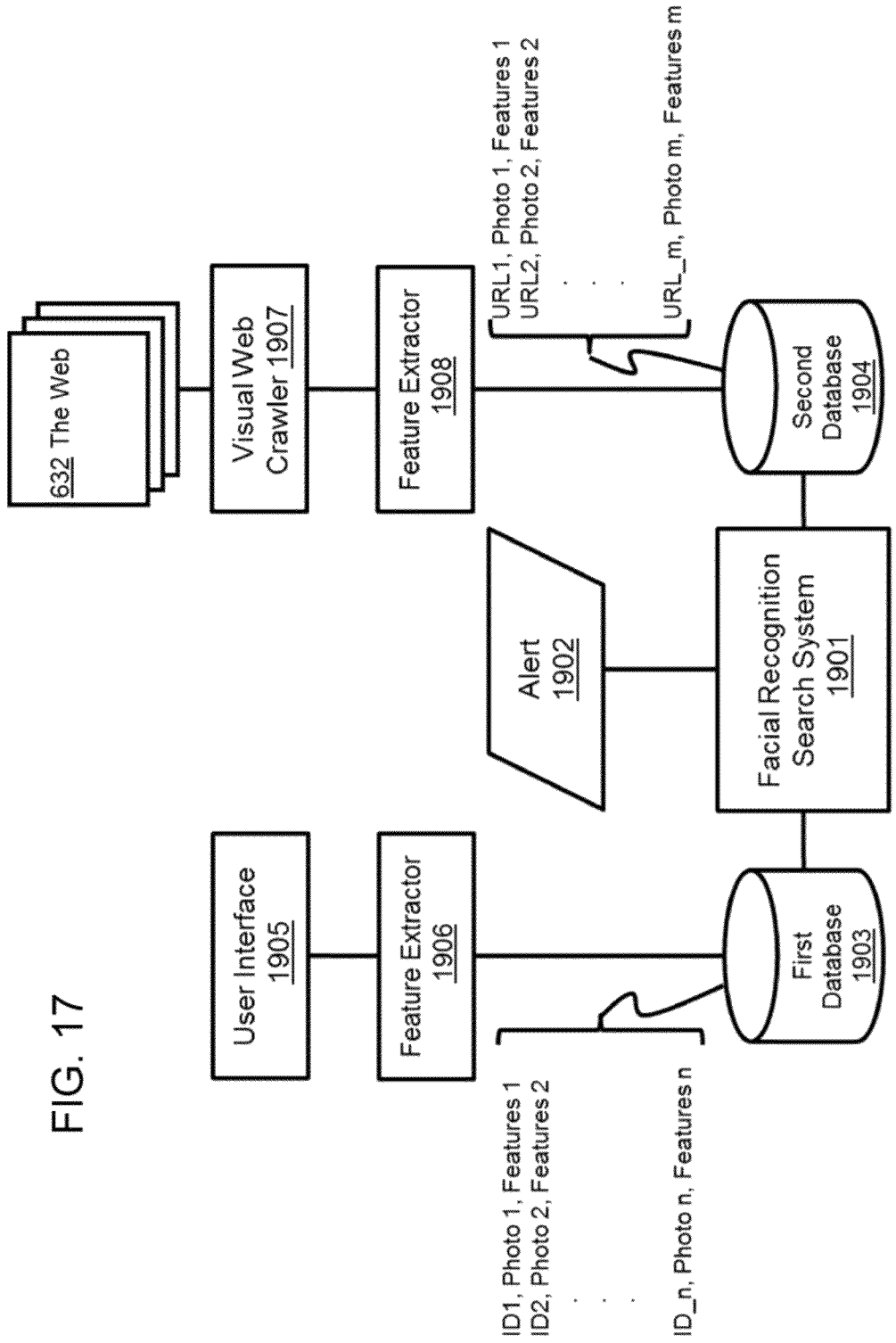
FIG. 17 is a block diagram of a system for monitoring photo usage.

Furthermore, given the discussion thus far, and with reference to FIG. 17, it will be appreciated that, in general terms, an example method of alerting an entity to use of an image, according to still another aspect of the invention, includes the step of obtaining access to a first database 1903 having a plurality of first database records. Each of the first database records includes at least an identification of a corresponding one of a plurality of entities (e.g., ID1, ID2, ID_n); and a plurality of features (Features 1, Features 2, Features n) of a plurality of images (Photo 1, Photo 2, Photo n) associated with the entities. A further step includes obtaining access to a second database 1904 having a plurality of second database records. Each of the second database records includes at least an identification (e.g., URL1, URL2, URL_m) of a corresponding one of a plurality of generalized web locations; and a plurality of features (e.g., Features 1, Features 2, Features m) of a plurality of images (e.g., Photo 1, Photo 2, Photo m) associated with the generalized web locations. Such a database can be obtained, for example, via a specialized visual web crawler 1907 that searches the web 632 for files containing photographs and/or other images of people and/or logos. As used herein, "generalized web locations" include at least web locations not under the control of the individual or organization carrying out the method steps, and optionally also include web locations that are under such control. For example, if the method steps were carried out by an organization that provides visual query based web searching, social networking, and a mechanism for expressing privacy preferences, generalized web locations would include at least some web locations 632 not under control of that organization, and would optionally include web locations, such as pages in the social networking service, that were under the control of the organization. The plurality of features are extracted from images obtained by crawling the generalized web locations, using feature extractor 1908. The extraction of features from images to carry out facial and/or logo recognition can be carried out with well known software routines.

Figure 20:
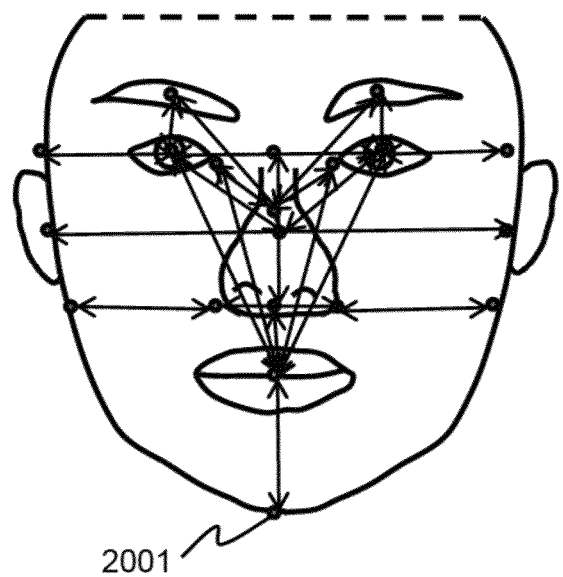
FIG. 20 shows example aspects of facial recognition.

Furthermore in this regard, FIG. 20 shows salient points 2001 (only one of the twenty points is numbered, to avoid clutter) that are mapped in order to define a particular person. Images can be clustered around that model and then be searchable by a certain identity (e.g., a description of the plotted points), parts of the model (similar facial features), or another arbitrary score. The points are shown on a line drawing for purposes of illustrative convenience, but the techniques are applied to photographs in one or more embodiments.

Figure 18:
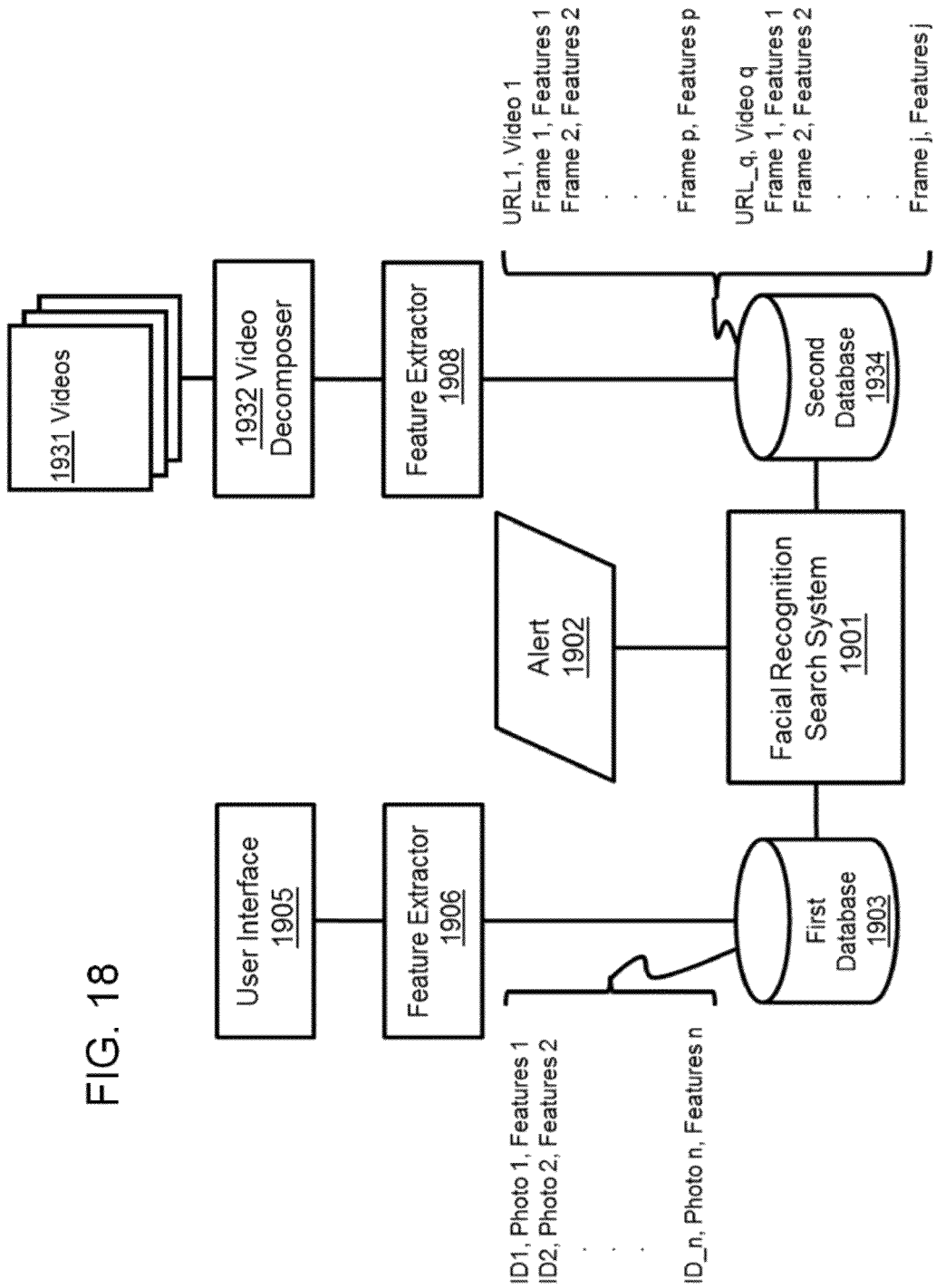
FIG. 18 is a block diagram of a system for monitoring video usage.
Figure 19:
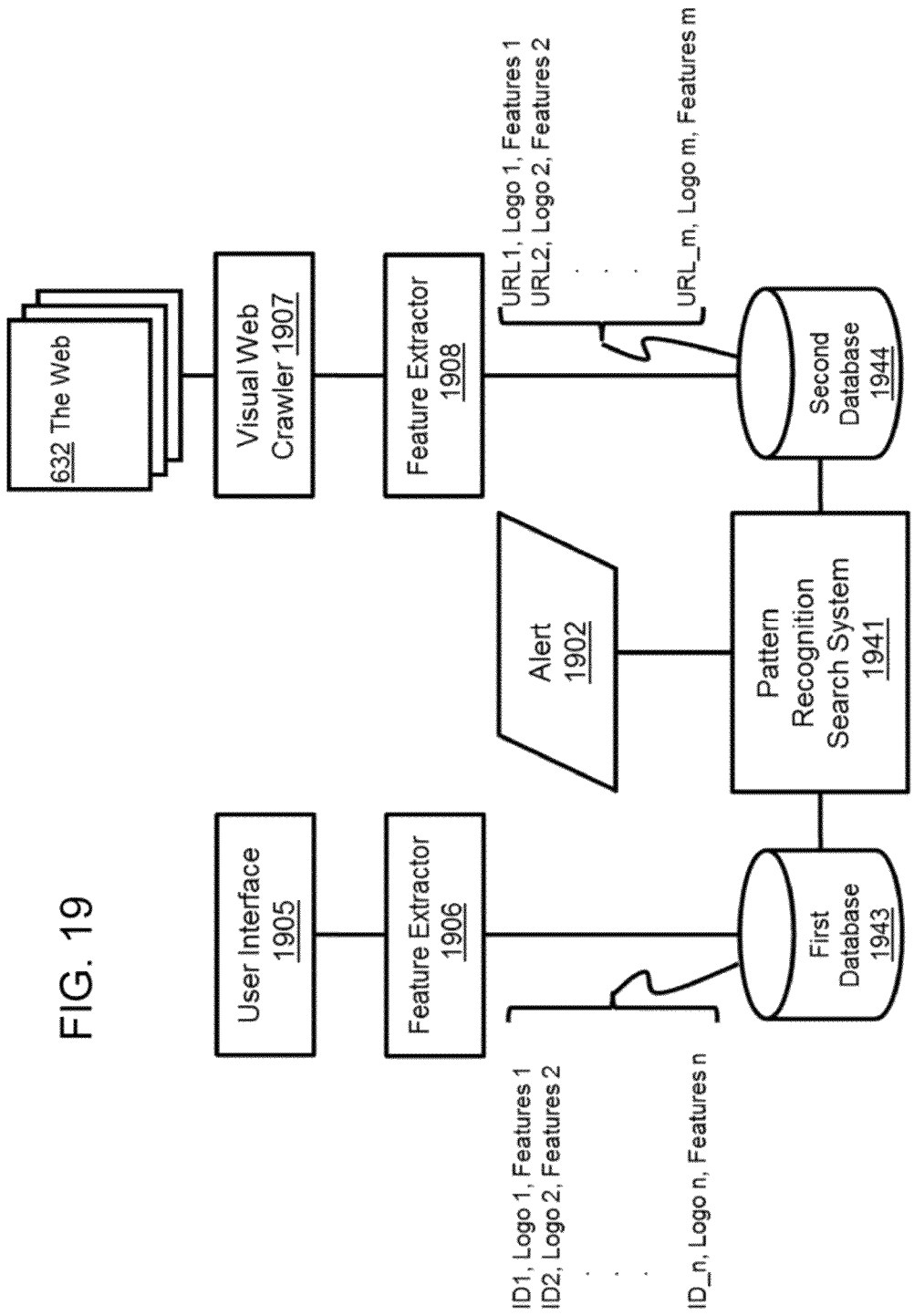
FIG. 19 is a block diagram of a system for monitoring logo usage.

Thus, the "features" referred to in the databases in FIGS. 17-19 should be broadly understood to include raw features, feature vectors, facial recognition scores from suitable models, and the like.

In one or more embodiments, visual web crawler 1907 crawls the web for web pages. If an image is located on a web page, a version of that image is stored in an index (e.g., second database 1904, 1944). A typical index entry may include, for example, the web page, some information associated with the web page, the URL of the web page, a version of the image, and possibly text surrounding the image and/or a title of the image file. These latter aspects (text and/or file title) help to identify the content of the image. When a user submits a normal text query, the text query is matched against the textual data. When a user submits a visual query (e.g., a photo of a person), the input image is processed to extract feature descriptions, by looking at interest points on the image (e.g., points shown in FIG. 20 and optionally color, texture, and the like). A feature vector is formed to characterize the image. Feature vectors of known images are stored in an index (e.g., second database 1904, 1944). A comparison is carried out with a suitable comparison model or the like. A similar technique is used in the ongoing search for general web images corresponding to images in first database 1903, 1943.

A still further step includes, for at least one of the first database records, comparing (e.g., with search system 1901) corresponding ones of the features of a corresponding one of the images associated with a corresponding one of the entities to the plurality of features in the second database records. An even further step 1902 includes advising a given one of the entities, corresponding to the at least one of the first database records (e.g., user with ID corresponding to the given image), if the comparison yields a probable match. The skilled artisan will be familiar with thresholding or the like to determine if a match has sufficient confidence to warrant an alert. System 1901 may employ appropriate functionality as described above with respect to server 110 and system 112, for example.

Figure 14:
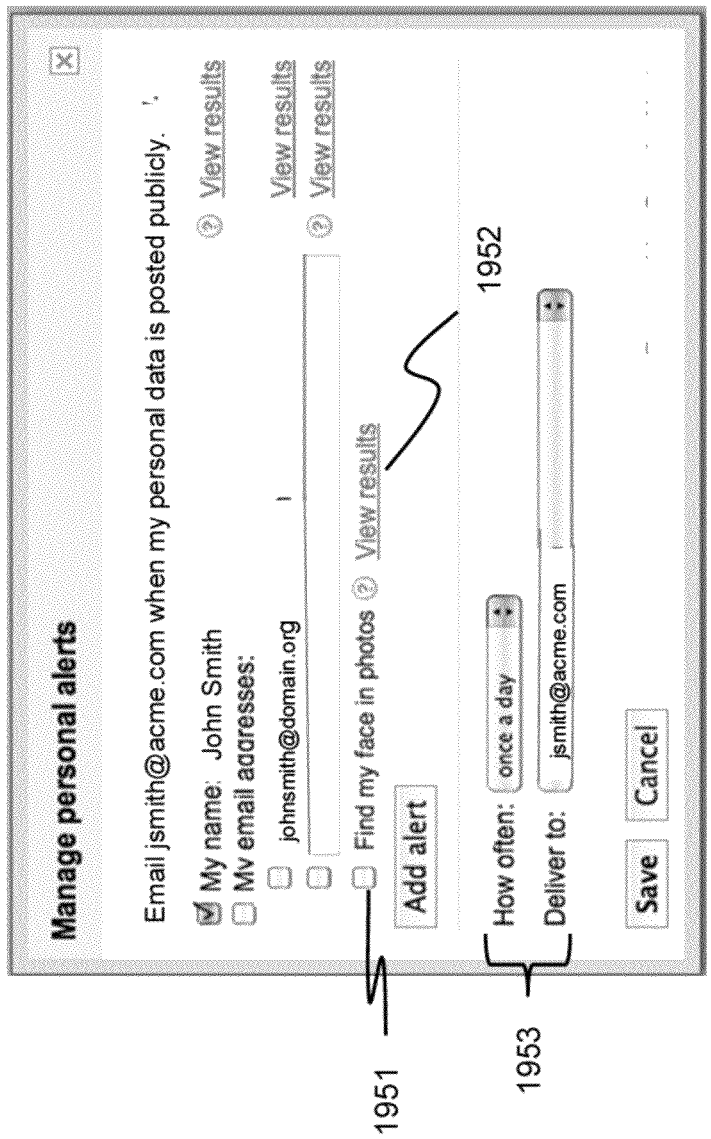
FIG. 14 is a "screen shot" of a dashboard for managing personal alerts, including photo posts.

In some embodiments, the advising step includes sending the given one of the entities an e-mail alert. In some such embodiments, a further step includes obtaining, from the given one of the entities, a selection of the e-mail alert during a registration process. FIG. 14 shows an example UI screen wherein a user may check a box, as at 1951, to initiate a search for use of his photo on the web; a link 1952 to immediately view results, and a selection mechanism 1953 where he may determine how often and at what e-mail address he wishes to be notified.

In some embodiments, the advising includes displaying a notification to the given one of the entities when the given one of the entities accesses a unified privacy dashboard, such as at link 1952 in FIG. 14.

In some cases, a further step includes displaying to the given one of the entities a given one of the plurality of images associated with a given one of the generalized web locations corresponding to matching ones of the features in the second database records (e.g., in response to clicking link 1952 or could be included in the e-mail).

In some cases, a further step includes affording the entity an opportunity to remediate improper use of a given one of the plurality of images associated with a given one of the generalized web locations corresponding to matching ones of the features in the second database records. A variety of remediation approaches are possible. Non-limiting examples include searching the page for email addresses such as "webmaster@domain"; looking up the technical and/or administrative contact for the domain in WHOIS, email abuse@domain; and so on. In some instances, a Digital Millennium Copyright Act (DMCA) takedown request template and/or form letter is provided.

In some instances, in the step of obtaining access to the first database, the entities include a first group of humans, and the plurality of images associated with the entities are photographs of the first group of humans. Furthermore, in such instances, in the step of obtaining access to the second database, the plurality of images associated with the web locations include photographs of a second group of humans; and the comparing step includes performing facial recognition (such as with system 1901). In some such instances, in the step of obtaining access to the second database, the photographs of the second group of humans are still photographs. In some such instances, in the step of obtaining access to the second database, the photographs of the second group of humans include frames of videos. The skilled artisan will appreciate that videos may be presented, digitized, and optionally compressed using a variety of techniques, such as MPEG-1, MPEG-2, MPEG-4, Adobe Flash Video, and the like. Not every frame of a video may be examined for faces. For example, in some cases, only I-frames, but not B-frames or P-frames, may be examined.

Figure 15:
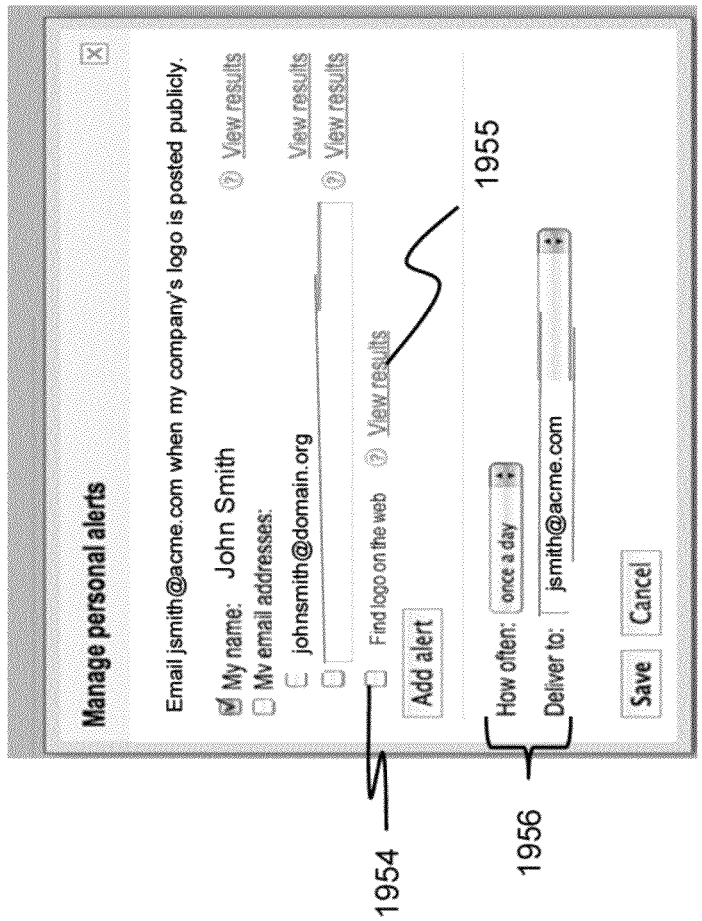
FIG. 15 is a "screen shot" of a dashboard for managing enterprise alerts, including logo usage.

Reference should now be had to FIGS. 15 and 19. Elements in FIG. 19 similar to FIG. 17 have the same reference character. In the approach of FIG. 19, with reference to the step of obtaining access to the first database 1943, the entities include enterprises and the plurality of images associated with the entities are logos of the enterprises. Thus, the records in database 1943 include ID1, ID2, ID_n of the enterprises, and Features 1, Features 2, Features n of the logos Logo 1, Logo 2, Logo n. In such cases, in the step of obtaining access to the second database 1944, the plurality of images associated with the web locations URL 1, URL2, URL_m are logos Logo 1, Logo 2, Logo m of enterprises; and the comparing step includes performing pattern recognition with pattern recognition search system 1941. FIG. 15 shows an example UI screen wherein a user may check a box, as at 1954, to initiate a search for use of his company's logo on the web; a link 1955 to immediately view results, and a selection mechanism 1956 where he may determine how often and at what e-mail address he wishes to be notified.

As used herein, a search system includes a facial recognition search system 1901 and/or a pattern recognition search system 1941.

In some embodiments, additional steps include crawling the generalized web locations 632 with visual web crawler 1907 to obtain the plurality of images associated with the generalized web locations; and extracting the plurality of features of the plurality of images associated with the generalized web locations, using feature extractor 1908, to populate the second database.

Figure 4:
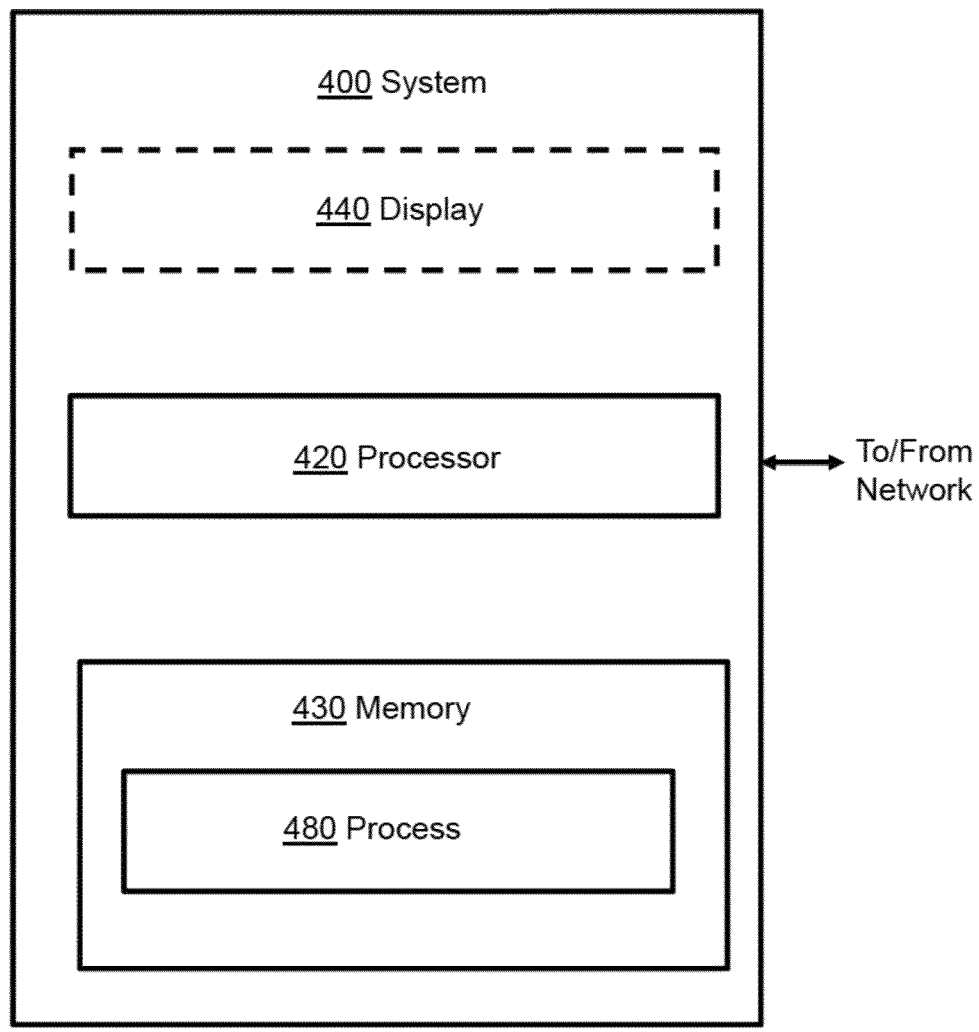
FIG. 4 is a block diagram of an example computer system useful in one or more embodiments described herein.

In some embodiments, an additional step includes populating the first database 1903 or 1943 by obtaining tags of images at a social network server (e.g., a server such as system 400 in FIG. 4 implementing a user interface 1905 (e.g., blocks 610, 620, 622). This is one non-limiting example of how the first database might be populated. In some cases, it may be populated when users register for a monitoring or reputation service. In some cases, it may be populated automatically as users upload and tag photos at a social networking site or the like (if such users consent to participation). A feature extractor 1906, which can be the same as or different from feature extractor 1908) extracts the features from the images to populate the features in database 1903, 1943.

Figure 16:
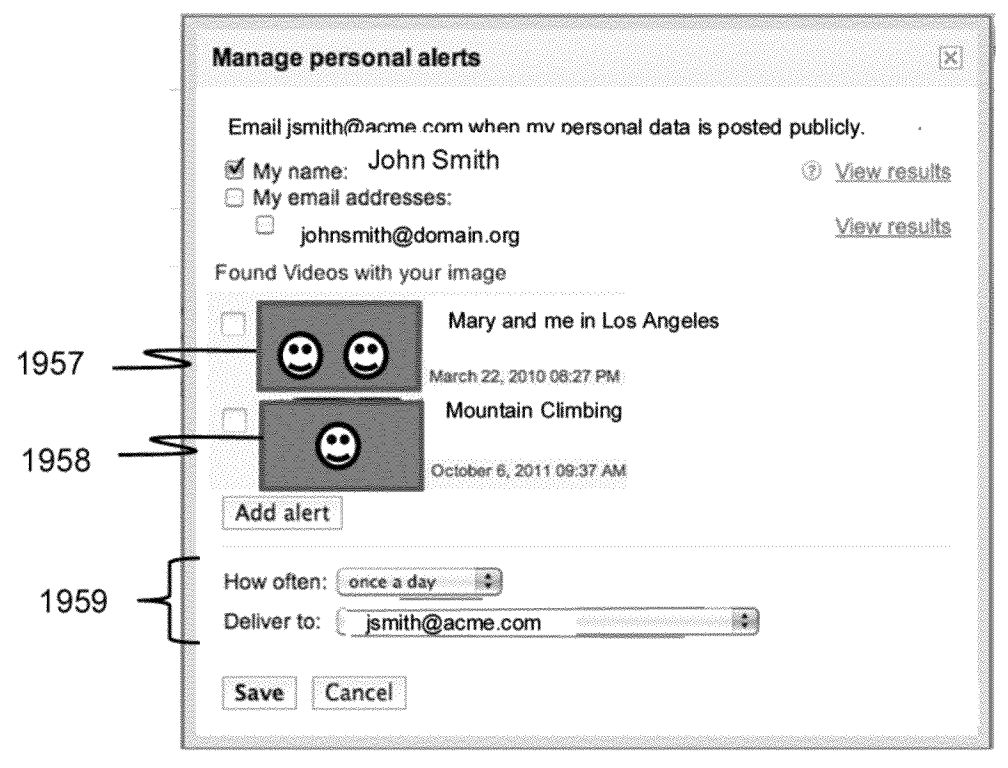

Furthermore, given the discussion thus far, and with reference to FIGS. 16 and 18, it will be appreciated that, in general terms, an example method of alerting a person to appearance in a video, according to a further aspect of the invention, includes the step of obtaining access to a first database 1903 having a plurality of first database records. Elements in FIG. 18 similar to those in FIG. 17 have received the same number. Each of the first database records includes an identification of a corresponding one of a plurality of humans; and features of a corresponding one of a plurality of photographs associated with the corresponding one of the plurality of humans. A further step includes deconstructing a plurality of videos 1931 into individual frames; for example, using a video decomposer 1932 which implements well-known software techniques. The videos 1931 may or may not be from "generalized web locations" 632 as defined above; for example, in some instances, they may be associated with a video sharing service that is run by an organization that also carries out the method steps. A still further step includes extracting features associated with images of human faces contained in the individual frames; feature extractor 1908 can be employed. An even further step includes populating a second database 1934 with a plurality of second database records. Each of the second database records includes an identifier of a corresponding one of the videos (e.g., the URL URL1, URL_q the video Video 1, Video q came from or some other identifier of the video). Each of the second database records also includes corresponding ones of the features associated with the images of the human faces contained in the corresponding one of the videos (e.g., Features 1-p or 1-j are stored for, respectively, Frames 1-p of Video 1 or Frames 1-j of Video q.). Another step includes, for at least one of the first database records, comparing the features of corresponding one of a plurality of photographs associated with the corresponding one of the plurality of humans to the features in the second database records (using, e.g., system 1901). Still another step includes advising the corresponding one of the plurality of humans (e.g., User A 612) if the comparing yields a probable match, as per 1902. In FIG. 16, detected videos 1957, 1958 are displayed to the user. A selection mechanism 1959 allows the user to specify how often and at what e-mail address he wishes to be notified.

Example System and Article of Manufacture Details

One or more embodiments can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, example method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii)

implement the specific techniques set forth herein, and the software modules are stored in a tangible computer-readable recordable storage medium (or multiple such media). Appropriate interconnections via bus, network, and the like can also be included.

FIG. 4 is a block diagram of a system 400 that can implement part or all of one or more aspects or processes. As shown in FIG. 4, memory 430 configures the processor 420 to implement one or more aspects of the methods, steps, and functions disclosed herein (collectively, shown as process 480 in FIG. 4). Different method steps can be performed by different processors. The memory 430 could be distributed or local and the processor 420 could be distributed or singular. The memory 430 could be implemented as an electrical, magnetic or optical memory, or any combination of these or other types of storage devices. It should be noted that if distributed processors are employed, each distributed processor that makes up processor 420 generally contains its own addressable memory space. It should also be noted that some or all of computer system 400 can be incorporated into an application-specific or general-use integrated circuit. For example, one or more method steps could be implemented in hardware in an ASIC rather than using firmware. Display 440 is representative of a variety of possible input/output devices (e.g., keyboards, mice, and the like) that may be used on clients and/or servers. Every processor may not have a display, keyboard, mouse or the like associated with it. Note that comments regarding computer system 400 are also generally applicable to clients 102, and their components, and to server devices 110, 112, 118, and their components.

In one or more embodiments, memory 430 configures a processor 420 to implement one or more methods, steps, and functions (collectively referred to as a process). The memory 430 could be distributed or local and the processor 420 could be distributed or singular. Different steps could be carried out by different processors.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 400), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is intended to encompass a recordable medium, examples of which are set forth above, but is not intended to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments described herein can include a computer program including computer program code means adapted to perform one or all of the steps of any methods or claims set forth herein when such program is run, for example, on system 400, and the like, and that such program may be embodied on a tangible computer readable recordable storage medium. As used herein, including the claims, a "server" includes a physical data processing system running a server program. It will be understood that such a physical server may or may not include a display, keyboard, or other input/output components. Furthermore, it should be noted that any of the methods described herein can include an additional step of providing a system including distinct software modules embodied on one or more tangible computer readable storage media. All the modules (or any subset thereof) can be on the same medium, or each can be on a different medium, for example. The modules can include any or all of the components shown in the figures (e.g. system 112, system 118, dashboard 610, account central 620, web search 630, UI 1905, feature extractors 1906, 1908, system 1901, crawler 1907, decomposer 1932, and/or system 1941). The method steps can then be carried out using the distinct software modules of the system, as described above, executing on one or more hardware processors. Further, a computer program product can include a tangible computer-readable recordable storage medium with code adapted to be executed to carry out one or more method steps described herein, including the provision of the system with the distinct software modules. In one or more embodiments, memories include tangible computer-readable recordable storage media as well as (volatile) memory on or accessible to the processor; code on one or more tangible computer-readable recordable storage media is loaded into the volatile memory and configures the processors to implement the techniques described herein.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of controlling access to visual query results, the method comprising the steps of:
  obtaining, by a unified search entity, from a requester, a visual query comprising at least a first facial image, the unified search entity comprising and entity the providers at least visual query based web searching and an associated mechanism for expressing privacy preference that provides for individual subject of the visual query to express the privacy preferences to suppress the requester from receiving a visual query result that is associated with the individual, for the requester not being logged into an online account of the unified search entity, or the requester not being in a social group of the individual;

Identifying, by the unified search entity, via facial recognition on the at least first facial image, of at least one of:
   an identity of an individual subject of the at least first facial image; and
   at least a second facial image associated with the at least first facial image, the at least second facial image being of the individual subject;

obtaining, by the unified search entity, from the individual subject of the least first facial image, via the mechanism for expressing privacy preference, a plurality of privacy preferences including a visual query preference of the individual subject of the at least first facial image; and for the visual query preference of the individual subject permitting the requester to receive the visual query result, communicating at least one of the identity of the individual subject and the at least second facial image, from the unified search entity, to the requester; and for the visual query preference of the individual subject suppressing the requester from receiving the visual query result, providing the requester with one of, an indication that the individual exists but does not permit the visual query of his or her facial image by a user not in the social group of the individual, and an option to invite the individual to a sharing group.

2. A method of controlling access to visual query results, the method comprising the steps of:
   obtaining, by a search entity, from a requester, a visual query comprising at least a first facial image;
   identifying, by the search entity, via facial recognition on the at least first facial image, general web content, from web pages not under control of the search entity, the general web content being associated with an individual subject of the first facial image;
   obtaining, by the search entity, from the individual subject of the at least first facial image, via a mechanism for expressing privacy preferences, at least one privacy preference comprising a visual query preference of the individual subject of the at least first facial image, wherein the mechanism provides for an individual subject of the visual query to express the privacy preferences to suppress the requester from receiving a visual query result that is associated with the individual, for the requester not being logged into an online account of the unified search entity, or the requester not being in a social group of the individual; and
   for the visual query preference of the individual subject permitting the requester to receive the visual query result, communicating at least a portion of the general web content, from the search entity, to the requester; and
   for the visual query preference of the individual subject suppressing the requester from receiving the visual query result, providing the requester with one of an indication that the individual exists but does not permit the visual query of his or her facial image by a user not in the social group of the individual, and an option to invite the individual to a sharing group.

3. The method of claim 2, wherein the identifying comprises:
   identifying the individual subject by performing the facial recognition to compare the at least first facial image to a database of stored images linked to corresponding people, the individual subject being one of the corresponding people; and
   identifying the general web content by carrying out a term-based general web search on the individual subject's name.

4. The method of claim 3, wherein the database of stored images is under control of the search entity.

5. The method of claim 2, wherein the identifying comprises:
   performing the facial recognition to compare the at least first facial image to an index database of general web content, obtained by a crawler, the index database of general web content including facial image data for comparison with the at least first facial image during the facial recognition.

6. The method of claim 2, further comprising determining, by the search entity, whether the requester has logged in; wherein the visual query preference specifies different treatment for the communicating of the general web content, from the search entity, to the requester, depending on whether the requester has logged in.

7. A method of alerting an entity to use of an image, the method comprising the steps of:
   obtaining access to a first database having a plurality of first database records, each of the first database records comprising at least:
   an identification of a corresponding one of a plurality of entities; and
   a plurality of features of a plurality of images associated with the entities;
   obtaining access to a second database having a plurality of second database records, each of the second database records comprising at least:
   an identification of a corresponding one of a plurality of generalized web locations; and
   a plurality of features of a plurality of images associated with the generalized web locations, the plurality of features being extracted from images obtained by crawling the generalized web locations;
   for at least one of the first database records, comparing corresponding ones of the features of a corresponding one of the images associated with a corresponding one of the entities to the plurality of features in the second database records to determine an identified entity of the plurality of entities;
   obtaining, from the identified entity, via a mechanism for expressing privacy preferences, at least one privacy preference comprising a visual query preference of the identified entity, wherein the mechanism provides for the identified entity of the comparing to express the privacy preferences to suppress a requester of the comparing from the receiving a visual query result that is associated with the identified entity, for the requester not being logged into an online account, or the requester not being in a social group of the identified entity, and further, the mechanism allows the individual subject of the query to express a preference for receiving an alert indicative of a use of the facial image of the identified entity in the second database records, and an online delivery address and frequency preference for the comparing and for receiving the alert; and
   advising the identified entity, corresponding to the at least one of the first database records, if the comparing yields a probable match.

8. The method of claim 7, wherein the advising comprises sending the given one of the entities an e-mail alert.

9. The method of claim 8, further comprising obtaining from the given one of the entities a selection of the e-mail alert during a registration process.

10. The method of claim 7, wherein the advising comprises displaying a notification to the given one of the entities when the given one of the entities accesses a unified privacy dashboard.

11. The method of claim 7, further comprising displaying to the given one of the entities a given one of the plurality of images associated with a given one of the generalized web locations corresponding to matching ones of the features in the second database records.

12. The method of claim 7, further comprising affording the identified entity an opportunity to remediate improper use by the requester a given one of the plurality of images associated with a given one of the generalized web locations corresponding to matching ones of the features in the second database records, wherein the remediating of the improper user comprises submitting a request by the identified entity for the improper use of the given one of the images to be removed from the second database.

13. The method of claim 7, wherein:
in the step of obtaining access to the first database, the entities comprise a first group of humans and the plurality of images associated with the entities comprise photographs of the first group of humans;
in the step of obtaining access to the second database, the plurality of images associated with the web locations comprise photographs of a second group of humans; and
the comparing step comprises performing facial recognition.

14. The method of claim 13, wherein, in the step of obtaining access to the second database, the photographs of the second group of humans comprise still photographs.

15. The method of claim 13, wherein, in the step of obtaining access to the second database, the photographs of the second group of humans comprise frames of videos.

16. The method of claim 7, wherein:
in the step of obtaining access to the first database, the entities comprise enterprises and the plurality of images associated with the entities comprises logos of the enterprises;
in the step of obtaining access to the second database, the plurality of images associated with the web locations comprise logos of enterprises; and
the comparing step comprises performing pattern recognition.

17. The method of claim 7, further comprising:
crawling the generalized web locations to obtain the plurality of images associated with the generalized web locations; and
extracting the plurality of features of the plurality of images associated with the generalized web locations, to populate the second database.

18. The method of claim 7, further comprising populating the first database by obtaining tags of images at a social network server.

19. The method of claim 7, wherein:
in the step of obtaining access to the first database, the pluralities of features of the plurality of images associated with the entities are stored as first database feature vectors; and in the step of obtaining access to the second database, the plurality of features of the plurality of images associated with the generalized web locations are stored as second database feature vectors.

20. The method of claim 7, further comprising providing a system, wherein the system comprises distinct software modules, each of the distinct software modules being embodied in a non-transitory manner on a tangible computer-readable recordable storage medium, and wherein the distinct software modules comprise a first database module, a second database module, and a search system module;
wherein:
the step of obtaining access to the first database is carried out by the first database module executing on at least one hardware processor;
the step of obtaining access to the second database is carried out by the second database module executing on at least one hardware processor;
the step of comparing is carried out by the search system module executing on at least one hardware processor; and
the step of advising the given one of the entities is initiated by the search system module executing on at least one hardware processor.

21. A method of alerting a person to appearance in a video, the method comprising the steps of:
obtaining access to a first database having a plurality of first database records, each of the first database records comprising:
an identification of a corresponding one of a plurality of humans; and
features of a corresponding one of a plurality of photographs associated with the corresponding one of the plurality of humans;
deconstructing a plurality of videos into individual frames;
extracting features associated with images of human faces contained in the individual frames;
populating a second database with a plurality of second database records, each of the second database records comprising:
an identifier of a corresponding one of the videos; and
corresponding ones of the features associated with the images of the human faces contained in the corresponding one of the videos;
for at least one of the first database records, comparing the features of corresponding one of a plurality of photographs associated with the corresponding one of the plurality of humans to the features in the second database records to determine an identified human of the plurality of humans;
obtaining, from the identified human, via a mechanism for expressing privacy preferences, at least one privacy preference comprising a visual query preference of the identified entity, wherein the mechanism provides for the identified entity of the comparing to express the privacy preferences to suppress a requester of the comparing from the receiving a visual query result that is associated with the identified entity, for the requester not being logged into an online account, or the requester not being in a social group of the identified entity, and further, the mechanism allows the individual subject of the query to express a preference for receiving an alert indicative of a use of the facial image of the identified entity in the second database records, and an online delivery address and frequency preference for the comparing and for receiving the alert; and advising the identified entity, corresponding to the at least one of the first database records, if the comparing yields a probable match.

22. The method of claim 21, wherein:
in the step of obtaining access to the first database, the features of the corresponding one of the plurality of photographs associated with the corresponding one of the plurality of humans are stored as first database feature vectors; and
in the step of populating the second database, the corresponding ones of the features associated with the images of the human faces contained in the corresponding one of the videos are stored as second database feature vectors.

23. An article of manufacture comprising a computer program product for alerting an entity to use of an image, the computer program product comprising:
a tangible computer-readable recordable storage medium, storing a non-transitory manner computer readable program code, the computer readable program code comprising:
computer readable program code configured to obtain access to a first database having a plurality of first database records, each of the first database records comprising at least:
an identification of a corresponding one of a plurality of entities; and
a plurality of features of a plurality of images associated with the entities;
computer readable program code configured to obtain access to a second database having a plurality of second database records, each of the second database records comprising at least:
an identification of a corresponding one of a plurality of generalized web locations; and
a plurality of features of a plurality of images associated with the generalized web locations, the plurality of features being extracted from images obtained by crawling the generalized web locations;
computer readable program code configured to, for at least one of the first database records, compare corresponding ones of the features of a corresponding one of the images associated with a corresponding one of the entities to the plurality of features in the second database records to determine an identified entity of the plurality of entities;
computer readable program code configured to obtain, from the identified entity, via a mechanism for expressing privacy preferences, at least one privacy preference comprising a visual query preference of the identified entity, wherein the mechanism provides for the identified entity of the comparing to express the privacy preferences to suppress a requester of the comparing from the receiving a visual query result that is associated with the identified entity, for the requester not being logged into an online account, or the requester not being in a social group of the identified entity, and further, the mechanism allows the individual subject of the query to express a preference for receiving an alert indicative of a use of the facial image of the identified entity in the second database records, and an online delivery address and frequency preference for the comparing and for receiving the alert; and
computer readable program code configured to initiate advising the identified entity, corresponding to the at least one of the first database records, if the comparing yields a probable match.

24. An apparatus for alerting an entity to use of an image, the apparatus comprising:
a memory; and
at least one processor, coupled to the memory, and operative to:
obtain access to a first database having a plurality of first database records, each of the first database records comprising at least:
an identification of a corresponding one of a plurality of entities; and
a plurality of features of a plurality of images associated with the entities;
obtain access to a second database having a plurality of second database records, each of the second database records comprising at least:
an identification of a corresponding one of a plurality of generalized web locations; and
a plurality of features of a plurality of images associated with the generalized web locations, the plurality of features being extracted from images obtained by crawling the generalized web locations;
for at least one of the first database records, compare corresponding ones of the features of a corresponding one of the images associated with a corresponding one of the entities to the plurality of features in the second database records to determine an identified entity of the plurality of entities;
obtain, from the identified entity, via a mechanism for expressing privacy preferences, at least one privacy preference comprising a visual query preference of the identified entity, wherein the mechanism provides for the identified entity of the comparing to express the privacy preferences to suppress a requester of the comparing from the receiving a visual query result that is associated with the identified entity, for the requester not being logged into an online account, or the requester not being in a social group of the identified entity, and further, the mechanism allows the individual subject of the query to express a preference for receiving an alert indicative of a use of the facial image of the identified entity in the second database records, and an online delivery address and frequency preference for the comparing and for receiving the alert; and
initiate advising the identified entity, corresponding to the at least one of the first database records, if the comparing yields a probable match.

25. The apparatus of claim 24, further comprising a plurality of distinct software modules, each of the distinct software modules being embodied in a non-transitory manner on a tangible computer-readable recordable storage medium, and wherein the distinct software modules comprise a first database module, a second database module, and a search system module;
wherein:
the at least one processor is operative to obtain access to the first database by executing the first database module;
the at least one processor is operative to obtain access to the second database by executing the second database module;
the at least one processor is operative to compare by executing the search system module; and
the at least one processor is operative to initiate advising the given one of the entities by executing the search system module.

26. An apparatus for alerting an entity to use of an image, the apparatus comprising:

means for obtaining access to a first database having a plurality of first database records, each of the first database records comprising at least:
an identification of a corresponding one of a plurality of entities; and
a plurality of features of a plurality of images associated with the entities;
means for obtaining access to a second database having a plurality of second database records, each of the second database records comprising at least:
an identification of a corresponding one of a plurality of generalized web locations; and
a plurality of features of a plurality of images associated with the generalized web locations, the plurality of features being extracted from images obtained by crawling the generalized web locations;
means for, for at least one of the first database records, comparing corresponding ones of the features of a corresponding one of the images associated with a corresponding one of the entities to the plurality of features in the second database records to determine an identified entity of the plurality of entities;

means for obtaining, from the identified entity, via a mechanism for expressing privacy preferences, at least one privacy preference comprising a visual query preference of the identified entity, wherein the mechanism provides for the identified entity of the comparing to express the privacy preferences to suppress a requester of the comparing from the receiving a visual query result that is associated with the identified entity, for the requester not being logged into an online account, or the requester not being in a social group of the identified entity, and further, the mechanism allows the individual subject of the query to express a preference for receiving an alert indicative of a use of the facial image of the identified entity in the second database records, and an online delivery address and frequency preference for the comparing and for receiving the alert; and means for initiating advising the identified entity, corresponding to the at least one of the first database records, if the comparing yields a probable match.

* * * * *